United States Patent
Lo et al.

(10) Patent No.: US 10,506,058 B2
(45) Date of Patent: *Dec. 10, 2019

(54) SIGNALING OF APPLICATION CONTENT PACKAGING AND DELIVERY

(71) Applicant: QUALCOMM Incorporated, San Diego, CA (US)

(72) Inventors: Charles Nung Lo, San Diego, CA (US); Giridhar Dhati Mandyam, San Diego, CA (US); Thomas Stockhammer, Bergen (DE); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 15/457,111

(22) Filed: Mar. 13, 2017

(65) Prior Publication Data
US 2017/0272530 A1 Sep. 21, 2017

Related U.S. Application Data

(60) Provisional application No. 62/310,366, filed on Mar. 18, 2016, provisional application No. 62/348,560, (Continued)

(51) Int. Cl.
*G06F 15/16* (2006.01)
*H04L 29/08* (2006.01)
(Continued)

(52) U.S. Cl.
CPC ......... *H04L 67/2804* (2013.01); *H04L 29/08* (2013.01); *H04L 65/4076* (2013.01);
(Continued)

(58) Field of Classification Search
USPC .......................................................... 709/219
See application file for complete search history.

(56) References Cited

U.S. PATENT DOCUMENTS

2010/0299702 A1* 11/2010 Lo ..................... G06Q 20/123
725/39
2011/0177775 A1 7/2011 Gupta et al.
(Continued)

FOREIGN PATENT DOCUMENTS

WO 2010135461 A2 11/2010
WO WO-2010135461 A2 * 11/2010 ........... G06Q 20/123
(Continued)

OTHER PUBLICATIONS

International Search Report and Written Opinion—PCT/US2017/022255—ISA/EPO—dated Jun. 20, 2017.

*Primary Examiner* — Hee Soo Kim
(74) *Attorney, Agent, or Firm* — The Marbury Law Group, PLLC

(57) ABSTRACT

Methods for delivering application content signaling information may include a generating a metadata fragment for application content items of an application to be acquired by a receiver device, adding to the metadata fragment a first set of attributes indicating that rendering of a linear service or a group of linear services is performed by a media player embedded in the application, and transmitting the metadata fragment to the receiver device. The first set of attributes may include an application launch page or launch file indicator for the application, and/or an indication of required capabilities for rendering the application and associated application content items. The first set of attributes may include a start time and an end time for at least one distribution window for the application, and the at least one distribution window may be associated with information
(Continued)

about auxiliary application content delivered during the at least one distribution window.

63 Claims, 13 Drawing Sheets

Related U.S. Application Data filed on Jun. 10, 2016, provisional application No. 62/400,418, filed on Sep. 27, 2016, provisional application No. 62/458,469, filed on Feb. 13, 2017.

(51) Int. Cl.
| | |
|---|---|
| *H04N 21/462* | (2011.01) |
| *H04N 21/845* | (2011.01) |
| *H04N 21/81* | (2011.01) |
| *H04N 21/482* | (2011.01) |
| *H04N 21/434* | (2011.01) |
| *H04N 21/643* | (2011.01) |
| *H04N 21/2362* | (2011.01) |
| *H04N 21/63* | (2011.01) |
| *H04N 21/414* | (2011.01) |
| *H04L 29/06* | (2006.01) |
| *H04N 21/25* | (2011.01) |
| *H04N 21/4335* | (2011.01) |
| *H04N 21/6405* | (2011.01) |

(52) U.S. Cl.
CPC ........ *H04L 65/4092* (2013.01); *H04L 65/602* (2013.01); *H04L 67/06* (2013.01); *H04L 67/10* (2013.01); *H04L 67/26* (2013.01); *H04L 67/2842* (2013.01); *H04L 67/34* (2013.01); *H04L 67/36* (2013.01); *H04N 21/2362* (2013.01); *H04N 21/25* (2013.01); *H04N 21/41407* (2013.01); *H04N 21/4335* (2013.01); *H04N 21/4345* (2013.01); *H04N 21/4622* (2013.01); *H04N 21/4825* (2013.01); *H04N 21/631* (2013.01); *H04N 21/64322* (2013.01); *H04N 21/8133* (2013.01); *H04N 21/8173* (2013.01); *H04N 21/8456* (2013.01); *H04N 21/6405* (2013.01)

(56) References Cited

U.S. PATENT DOCUMENTS

| | | | |
|---|---|---|---|
| 2013/0159546 A1* | 6/2013 | Thang | H04L 65/4084 709/231 |
| 2014/0201334 A1* | 7/2014 | Wang | H04L 65/4084 709/219 |
| 2015/0081838 A1* | 3/2015 | Stockhammer | H04L 67/10 709/217 |
| 2015/0081851 A1* | 3/2015 | Oyman | H04W 74/0833 709/219 |
| 2017/0272543 A1 | 9/2017 | Lo et al. | |

FOREIGN PATENT DOCUMENTS

| | | | |
|---|---|---|---|
| WO | 2011088264 A1 | 7/2011 | |
| WO | WO-2011088264 A1 * | 7/2011 | ....... H04N 21/26266 |
| WO | 2015038982 A1 | 3/2015 | |

\* cited by examiner

SIGNALING OF APPLICATION CONTENT PACKAGING AND DELIVERY

CROSS-REFERENCE TO RELATED APPLICATIONS

This application claims the benefit of priority under C.F.R. 371(c) of U.S. Provisional Application No. 62/310,366 entitled "Signaling of Application Content Packaging and Delivery" filed Mar. 18, 2016, the entire contents of which are hereby incorporated by reference.

This application claims the benefit of priority under C.F.R. 371(c) of U.S. Provisional Application No. 62/348,560 entitled "Signaling of Application Content Packaging and Delivery" filed Jun. 10, 2016, the entire contents of which are hereby incorporated by reference.

This application claims the benefit of priority under C.F.R. 371(c) of U.S. Provisional Application No. 62/400,418 entitled "Signaling of Application Content Packaging and Delivery" filed Sep. 27, 2016, the entire contents of which are hereby incorporated by reference.

This application claims the benefit of priority under C.F.R. 371(c) of U.S. Provisional Application No. 62/458,469 entitled "Signaling of Application Content Packaging and Delivery" filed Feb. 13, 2017, the entire contents of which are hereby incorporated by reference.

This application is related to U.S. patent application Ser. No. 15/457,145 entitled "Signaling of Application Content Packaging and Delivery" filed contemporaneously herewith.

BACKGROUND

In current networks, for example Multimedia Broadcast/Multicast Service (MBMS) networks, different content items associated with an application service may be available via different delivery methods, such as unicast/broadband delivery, broadcast delivery, download delivery, etc. However, in current networks, no single document signals the content and delivery attributes for application content items associated with an application. This lack of a single source of content and delivery information presents challenges in providing continuous services in current networks.

SUMMARY

Various embodiments may include methods, computing devices with processors implementing the methods, and non-transitory processor-readable storage media including instructions configured to cause a processor to execute operations of the methods for delivering and obtaining application content signaling information. Various embodiments may include a processor of a server generating a metadata fragment for one or more application content items of an application to be acquired by a receiver device, adding to the metadata fragment a first set of attributes of the application content for delivery over a first delivery method, and transmitting the metadata fragment to the receiver device.

In some embodiments, the first delivery method may include a broadcast delivery and the first set of attributes may include a transport session identifier of a Layered Coding Transport (LCT) session for the application content and a content location of each application content item. In some embodiments, the first delivery method may include a unicast delivery.

In some embodiments, the first set of attributes may include a Uniform Resource Indicator (URI) of each application content item. In some embodiments, the first set of attributes may include an application launch page or launch file indicator for the application. In some embodiments, the first set of attributes may include an indication of required capabilities for rendering the application and its associated one or more application content items. In some embodiments, the first set of attributes may include an indication that rendering of a main service to which the application is associated is to be performed by a media player embedded in the application. In some embodiments, the first set of attributes may include a list of other main services that use the same application described by the metadata fragment.

Some embodiments may include determining whether the application content may be delivered over a second delivery method and adding to the metadata fragment a second set of attributes of the application content for delivery over the second delivery method.

In some embodiments, the at least one distribution window may be associated with information about auxiliary application content delivered during the at least one distribution window.

In some embodiments, the information about auxiliary application content may include at least one of a transport session identifier (TSI) that identifies a File Delivery Over Unidirectional Transport (FLUTE) or a Real-Time Object Delivery over Unidirectional Transport (ROUTE) session, a resource identifier of the auxiliary application content that matches a content location attribute in a File Delivery Table (FDT) or an Extended File Delivery Table (EFDT) associated with the FLUTE or the ROUTE session, and an indication of a number of times the auxiliary application content is expected to be used by the application.

Various embodiments may include a processor of a receiver device receiving a metadata fragment for an application content item associated with an application, identifying one or more delivery methods from the metadata fragment for delivering the application content item to the receiver device, selecting a delivery method from the identified one or more delivery methods, determining a location for the application content item from a set of attributes associated with the selected delivery method, and obtaining the application content item from the determined location through the selected delivery method.

Some embodiments may include determining whether an attribute in the set of attributes indicates there is an application launch page or launch file for the application content item, and obtaining the application launch page or launch file from the determined location through the selected delivery method in response to determining that an attribute in the set of attributes indicates there is an application launch page or launch file for the application.

Some embodiments may include caching the application content item for future use by an application launched from the application launch page or launch file.

In some embodiments, obtaining the application launch page or launch file may be prioritized over obtaining the application content item. Such embodiments may include caching the obtained application content item in response to determining that no attribute in the set of attributes indicates there is an application launch page or launch file for the application.

In some embodiments, the selected delivery method may include a broadcast delivery, and determining the location of the application content item from the set of attributes may include determining the location of the application content item from a first attribute in the set of attributes indicating a transport session of a Layered Coding Transport (LCT) session for the application content item.

In some embodiments, determining the location of the application content item from the set of attributes may include determining the location of the application content item from a first attribute in the set of attributes indicating a transport session of a Layered Coding Transport (LCT) session for the application content item and from a second attribute in the set of attributes indicating a delivery object of the LCT session.

In some embodiments, the selected delivery method may include a unicast delivery. In such embodiments, the location of the application content item may be further determined from a second attribute in the set of attributes indicating a uniform resource indicator of the application content item. In some embodiments, the first set of attributes may include a list of other main services that use the same application described by the metadata fragment.

Various embodiments may include a processor of a receiver device receiving a metadata fragment for an application content item associated with an application, selecting a delivery method from the metadata fragment, wherein the metadata fragment comprises a set of attributes, determining a location for the application content item from the set of attributes, and obtaining the application content item from the determined location through the selected delivery method.

Some embodiments may include determining whether the receiver device is capable of executing the application content item based on the set of attributes and not obtaining the application content item in response to determining that the receiver device is not capable of executing the application content item.

Some embodiments may include determining whether a current time is within a distribution window for delivering the application content item from the set of attributes and not obtaining the application content item in response to determining that the current time is within a distribution window for delivering the application content item.

Some embodiments may include determining whether the receiver device already stores the application content item from the set of attributes and not obtaining the application content item in response to determining that the receiver device already stores the application content item.

Some embodiments may include determining whether the application content item includes an embedded player from the set of attributes and rendering media content associated with the application using the embedded player in response to determining that the application content item includes the embedded player. Such embodiments may include rendering media content associated with the application using a native player on the receiver device in response to determining that the application content item does not include the embedded player. Such embodiments may include determining whether the application is required to play an associated main linear service, rendering the main linear service using the embedded player in response to determining that the application is required to play the associated main linear service, and rendering the main linear service using a native player on the receiver device in response to determining that the application is not required to play the associated main linear service.

Some embodiments may include caching the application content item.

In some embodiments, the first set of attributes may include a list of other main services that use the same application described by the metadata fragment.

Further embodiments include a server having a processor and circuitry configured to perform one or more operations of the methods summarized above. Further embodiments include a server having means for performing functions of the methods summarized above. Further embodiments include a non-transitory processor-readable storage medium having stored thereon server-executable instructions configured to cause a server to perform operations of the methods summarized above.

Further embodiments include a receiver device having a processor and circuitry configured to perform one or more operations of the methods summarized above. Further embodiments include a receiver device having means for performing functions of the methods summarized above. Further embodiments include a non-transitory processor-readable storage medium having stored thereon server-executable instructions configured to cause a receiver device to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the various embodiments described herein.

DETAILED DESCRIPTION

Figure 1:
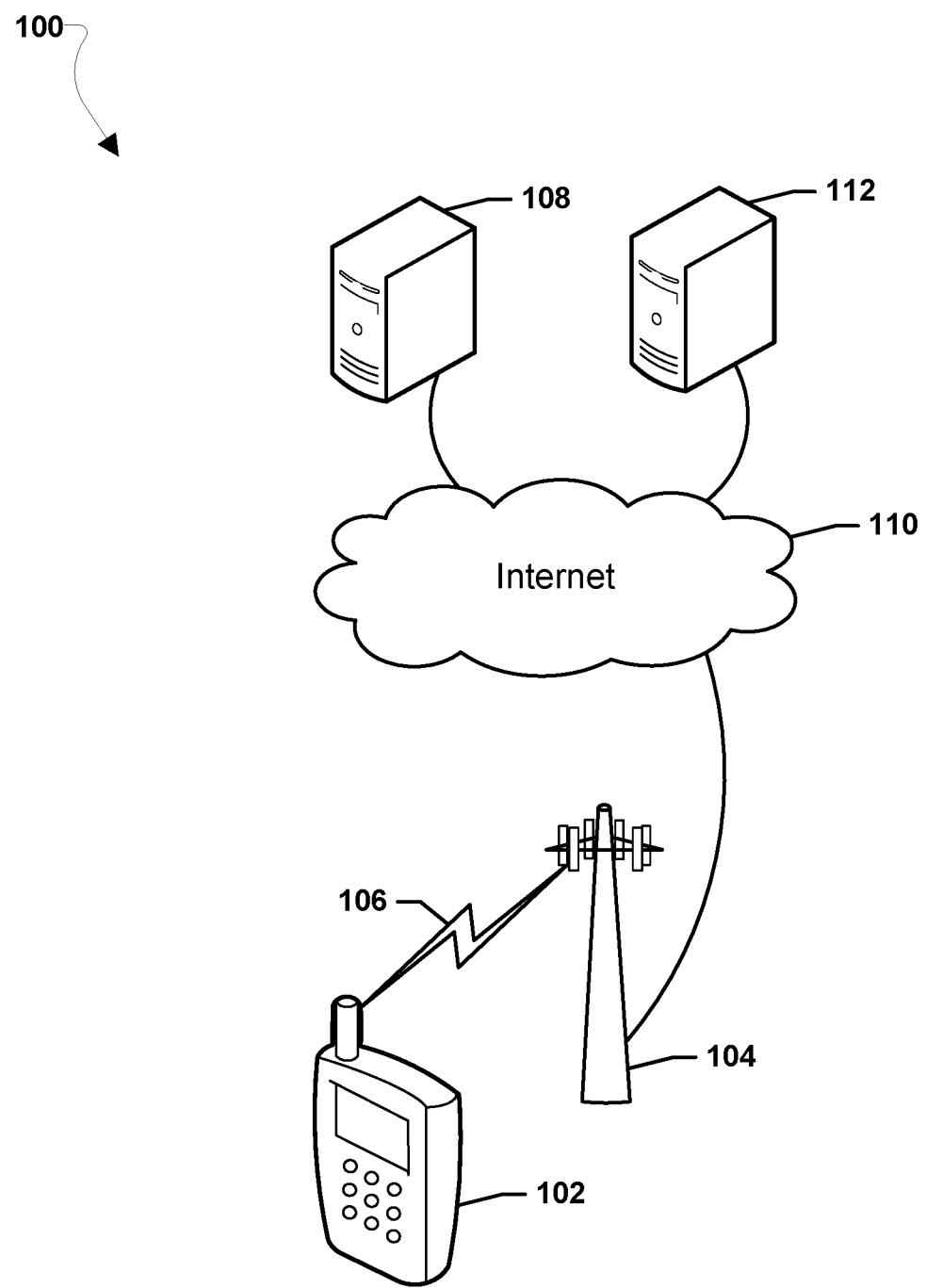
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

As used herein, the terms "mobile device" and "receiver device" are used interchangeably herein to refer to any one or all of cellular telephones, smart phones, personal or mobile multi-media players, personal data assistants (PDA's), laptop computers, tablet computers, set top boxes, smart books, smart watches, home entertainment systems, televisions, palm-top computers, wireless electronic mail receivers, multimedia Internet enabled cellular telephones, wireless gaming controllers, and similar personal electronic devices which include a programmable processor and memory and circuitry for receiving broadcast services.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server (e.g., running an application which may cause the computing device to operate as a server). A server (e.g., server application) may be a full function server, or a light or secondary server (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein.

In current Dynamic Adaptive Streaming over HyperText Transfer Protocol (HTTP) (DASH) delivery over MBMS (as described in section 5.6 of 3GPP TS 26.346) or Real-Time Object Delivery over Unidirectional Transport (ROUTE), a User Service Bundle Description (USBD) metadata fragment for a service contains a mediaPresentationDescription element referencing a media presentation description (MPD), and may also contain an associatedProcedureDescriptionURl in MBMS or apdUri attribute in DASH/ROUTE referencing an Associated Procedure Description (APD), both of which are metadata fragments describing the DASH-over-MBMS or DASH/ROUTE service. However, in current DASH/ROUTE delivery over Advanced Television Systems Committee (ATSC) networks (as described in section 5.6 of 3GPP TS 26.346 and S33-1 ATSC Standard: Signaling, Delivery, Synchronization, and Error Protection), the usage of the mediaPresentationDescription element is restricted as all resources referenced in the MPD must be delivered through a single download delivery session.

In a first implementation, the USBD may indicate that one or more objects associated with a service available in an ATSC, MBMS, or other similar network, such as application content items, may be delivered through one or more delivery methods. For example, the USBD may indicate that the application content may be acquired through a broadcast delivery, unicast/broadband delivery, or both. The USBD may map application content items associated with an application service to their respective delivery methods. The USBD may be a data structure component of a service (e.g., an MBMS service, or a terrestrial broadcast TV service such as delivered according to the ATSC 3.0 standard) announcement and discovery information that provides metadata related to the content items of an associated application service, including, but not limited to, the delivery context, the delivery method, object access information, content characteristics, etc. An application content item may be any content component delivered as part of an application service, or an application file, media asset, or application package associated with a broadcaster application that is contained in a linear service. The ATSC 3.0 standard specifies an extended version of a USBD as a component of the ATSC 3.0 service layer signaling data. However, even with such an extension the USBD does not indicate certain information or attributes of the application content, such as content location, content type, version or package information, or indicators of whether the content includes an application launch page or launch file. This information may be useful to support emerging packaging and signaling standards, such as those proposed for ATSC 3.0 systems.

In a second implementation, the APD referenced by the USBD may indicate that one or more objects associated with a service available in an ATSC, MBMS, or other similar network, such as application content items, may be delivered through one or more delivery methods. For example, the APD may indicate that the application content may be acquired through a broadcast delivery, unicast/broadband delivery, or both. The APD may map application content items associated with an application service to their respective delivery methods. The APD may be a data structure component of a service (e.g., an MBMS service, or a terrestrial broadcast TV service such as delivered according to the ATSC 3.0 standard) announcement and discovery information that provides metadata related to the content items of an associated application service, including, but not limited to, the delivery context, the delivery method, object access information, content characteristics, etc. An application content item may be any content component delivered as part of an application service, or an application file, media asset, or application package associated with a broadcaster application that is contained in a linear service. The ATSC 3.0 standard specifies an APD in the form of a constrained and profiled version of the MBMS APD for carrying metadata pertaining to file repair. In ATSC 3.0, the USBD, APD and MPD are considered components of the ATSC 3.0 service layer signaling data. However, the existing ATSC 3.0 APD does not indicate certain information or attributes of the application content, such as content location, content type, version or package information, or indicators of whether the content includes an application launch page or launch file. Similar to the use of the USBD for this purpose, this information in the APD may be useful to support emerging application packaging and signaling standards, such as those proposed for ATSC 3.0 systems.

As compared to using the USBD for carrying application packaging and signaling information, doing so using the APD provides an advantage that the basic service signaling information in the USBD, such as service ID, name and language (e.g. "12789", "Channel XBC", "English"), are nominally static parameters which can remain unchanged for a very long period—e.g. months or years. This affords simplicity for the broadcast service provider, or broadcaster, in managing the storage and distribution of the USBD as pseudo-static information. On the other hand, service signaling is inherently of a dynamic nature. For example, application functions associated with a service that may change at program boundaries is placed in a metadata fragment such as the APD, referenced by a fixed identifier, such as a Uniform Resource Locator (URL). Clean separation of static and dynamic signaling data carried in different types of metadata fragments minimizes the overhead for the administration of service discovery information.

Various embodiments provide methods and communication systems and devices enabling delivery and reception of content attribute information regarding application content items while also providing information about delivery methods for delivery the application content items to a receiver device.

In various embodiments, a server (e.g., a service signaling server) may receive a notification that one or more application content items are ready for delivery to a receiver device. The application content items may be associated with an application or one or more Hypertext Markup Language (HTML) pages. An application executing on the receiver device may initiate a request for the application content items, or the availability of the delivery of the application content items may be announced by service signaling. The server may generate a USBD or an APD data structure for the application content. The server may extend the USBD or the APD by adding a set of attributes of the application content for each delivery method applicable to the application content item. For example, the application content may be delivered through broadcast, unicast/broadband, or both. The set of attributes for each delivery method may include, but are not limited to, the location of the application content, a source flow of the application content, a content type of the application content, a version identifier of the application content, a package identifier of the application content, and whether the application content includes an application launch page or launch file that may be obtained and launched.

Another type of application content signaling information carried in the USBD or the APD is an explicit broadcast delivery window, or distribution window for the application content, defining the one or more start and end times of transmitting this application content over the broadcast channel. It may be useful to deliver application content items that don't need to be frequently and repeatedly sent, for example, in the form of a broadcast carousel. Additional application content signaling information carried in the USBD or the APD may be the identification of services to which the same set of application content items, including the launch page or launch file, apply.

An example use case of a common application used across multiple services is that of a broadcast station which offers multiple services, or so-called major/minor TV channels in the same radio frequency (RF) bandwidth allocation (e.g. 6 MHz). Those services/channels may employ the same applications for providing enhanced features such as personalized advertisements or interactive displays during the playout of content on those services. For a user who tunes between those channels provided by the same broadcast station, the receiver device may have a reason to learn the affiliation between a set of application content items and the services to which those contents are applicable. For example, the receiver device may choose to retain the application content during the change among those services/channels, instead of discarding or deleting that content from storage memory and having to acquire the same application content all over again immediately afterwards.

The server may transmit the APD and/or the USBD to the receiver device, and the receiver device may receive the USBD or the APD from the server.

A receiver device may identify from the USBD or the APD one or more delivery methods for delivering application content to the receiver device. The receiver device may select at least one of the delivery methods and search the USBD or the APD for location and content attributes of the application content for delivery through the selected delivery method. The USBD or the APD may store a set of attributes associated with the selected delivery method. The receiver device may determine various location and content attributes from the set of attributes, including a location for the application content, a version identifier, a package identifier, a content type, and whether the application content includes an application launch page or launch file. The receiver device may obtain the application content from the determined location through the selected delivery method. If the APD stores distribution window information, the receiver device may determine whether the distribution window is still active (i.e., the current time is between the start and end times), and distribute the application content item when the distribution window is active. The APD may also store one or more services that are associated with the application content. If the receiver device switches between services, the receiver device may determine from the USBD or the APD whether the application content is also applicable to the new service. The USBD or the APD may also include an indication of whether the application file or launch page of the application content it describes is required to render the main service to which the application content belongs, for example, a linear TV service.

The various embodiments may be applicable to the delivery of any application content item associated with any application service available in ATSC broadcast television systems or MBMS networks, examples of which include objects associated with Dynamic Adaptive Streaming over HTTP (DASH) services, ROUTE services, Apple® HTTP Live Streaming services, Hypertext Markup Language (HTML) pages, etc. While the various embodiments and examples are discussed herein using DASH, ROUTE, Apple® HTTP Live Streaming, and HTML pages as example application services, the discussions of DASH, ROUTE, Apple® HTTP Live Streaming, and HTML pages are merely examples to better illustrate the aspects of the various embodiments, and are not intended to limit the claims. Other application services, such as any application service having associated objects for delivery in ATSC or MBMS networks, may be used with the various embodiments, and the services and their associated objects may be substituted in the various examples and embodiments without departing from the spirit or scope of the various embodiments.

In various embodiments, the USBD and APDs may be generated in any format and may be applicable to different application services, including as USBDs or APDs not specific to any one protocol or broadcast technology (e.g., any one of the collective of MBMS User Service Announcement and Discovery metadata fragments, an ATSC 3.0 Service Layer Signaling metadata fragment, a standalone document, etc.), as DASH specific application service documents (e.g., an MPD, etc.), as an HTML page with linked objects, an Apple® HTTP Live Streaming specific application service document (e.g., a M3U8 file), or any other type document.

In various embodiments, application content items of an application service may be delivered through one or more delivery contexts, including as content items or media components via broadcast delivery over a File Delivery Over Unidirectional Transport (FLUTE) session; as content items or media components via broadcast delivery over a ROUTE session; and/or as content items or media components via HTTP unicast delivery. As an example, the application service may include media streams delivered through multiple FLUTE or ROUTE sessions, or through HTTP unicast.

FIG. 1 illustrates a cellular network system 100 suitable for use with the various embodiments. The cellular network system 100 may include multiple devices, such as a receiver device 102, one or more cellular towers or base stations 104, and servers 108 and 112 connected to the Internet 110. The receiver device 102 may exchange data via one or more cellular connections 106, including Third Generation (3G), Fourth Generation (4G), Long Term Evolution (LTE), Time Division Multiple Access (TDMA), Code Division Multiple Access (CDMA), CDMA 2000, Wideband CDMA (WCDMA), Global System for Mobile Communications (GSM), Single-Carrier Radio Transmission Technology (1xRTT), and Universal Mobile Telecommunications Systems (UMTS), or any other type connection, with the cellular tower or base station 104.

The cellular tower or base station 104 may be in communication with a router which may connect to the Internet 110. In this manner, via the connections to the cellular tower or base station 104, and/or Internet 110, data may be exchanged between the receiver device 102 and the server(s) 108 and 112. In an embodiment, the server 108 may be one or more broadcast network operator servers controlling the operations of the cellular network 100 including the receiver device 102 and the cellular tower or base station 104 and the provisioning of services to the receiver device 102 from the content server(s) 108 and 112.

Figure 2A:
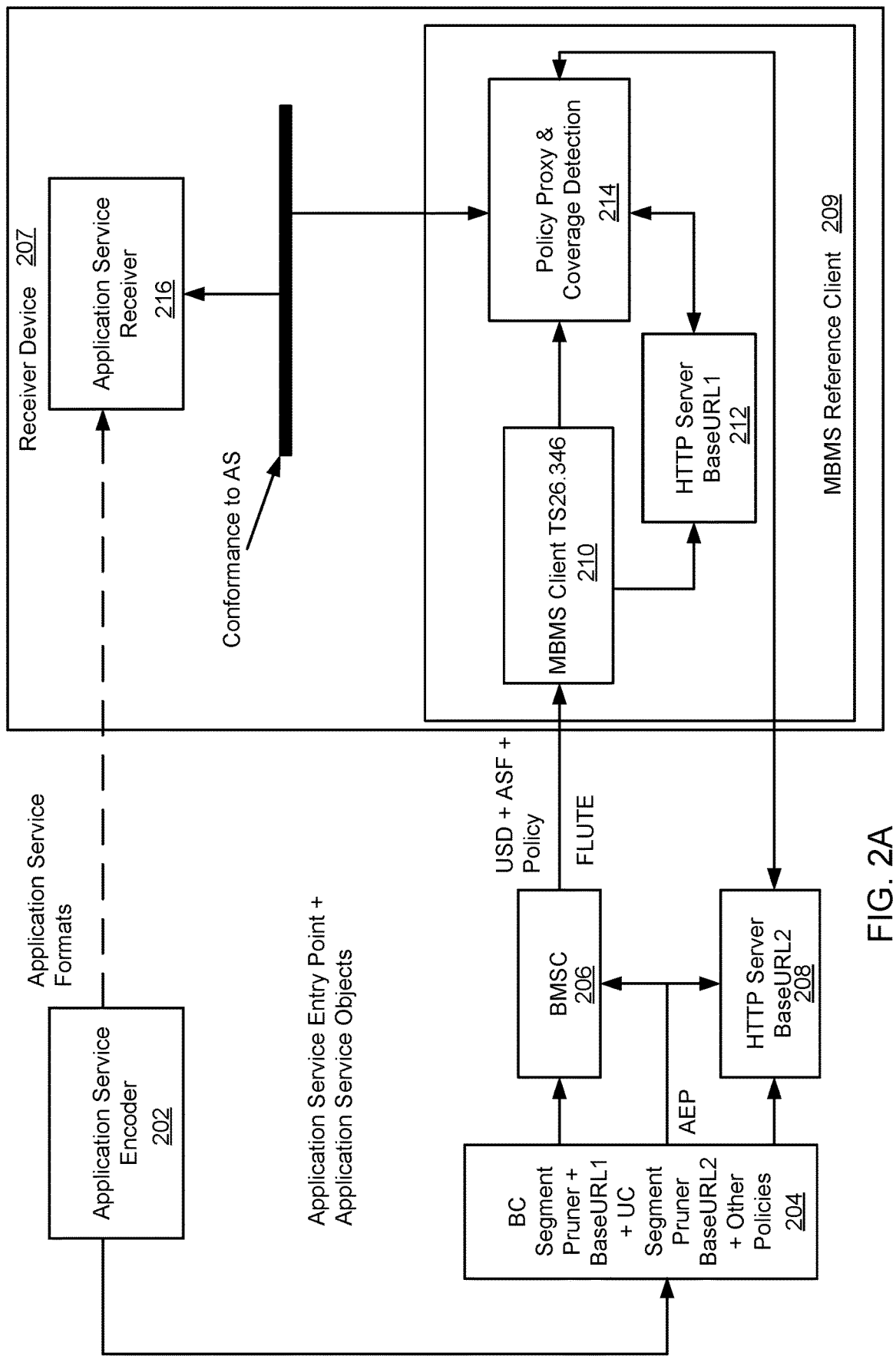
FIG. 2A is a block diagram of components of an MBMS network system suitable for use with the various embodiments.

FIG. 2A illustrates various components of an MBMS network including an application service encoder 202, MBMS network operator server 204, HTTP server 208, Broadcast Multicast Service Center (BMSC) server 206, and receiver device 207. The receiver device 207 may include a MBMS reference client 209 that may manage receipt of application content items via various delivery methods, such as unicast, broadcast, MBMS download delivery, etc. and make received application content items available to the application service receiver 216, such as a DASH player, Apple® HTTP Live Streaming player, etc. The application service encoder 202 may encode application content items in an application service format, such as DASH, ROUTE, Apple® HTTP Live Streaming, etc. and output the objects for the service to an MBMS network operator server 204 for delivery to the receiver device 207. The application service encoder 202 may encode the application content items of the service using an application service format that is the same application service format used by the application service receiver 216 of the receiver device 207. The MBMS network operator server 204 may receive the application content items for the service from the application service encoder 202 and prune the segments of the service and apply other policies as appropriate.

The MBMS network operator server 204 may generate an application service entry point document, such as an MPD for a DASH media presentation, an HTML page, an Apple® HTTP Live Streaming M3U8 play list, etc., based on various attributes of the application content items, network policy, and/or other considerations (e.g., bandwidth, expected popularity, content dynamics, etc.), and send the application service entry point document to the BMSC server 206 and the HTTP server 208. The MBMS network operator server 204 may also generate a USBD and provide the USBD and application content items for the application service to the BMSC server 206 and/or the HTTP server 208.

The BMSC server 206 may provide the USBD, other network policy indications, the application service entry point document, and application content items of the application service to a 3GPP MBMS client 210 of the MBMS reference client 209 via FLUTE.

The 3GPP MBMS client 210 may provide the USBD, other network policy indications, the application service entry point document, and application content items of the application service to the policy proxy and coverage detection unit 214 of the MBMS reference client 209.

The HTTP server 208 may provide the USBD, other network policy indications, the application service entry point document, and application content items of the application service to a policy proxy and coverage detection unit 214 of the MBMS reference client 209.

The 3GPP MBMS client 210 and the policy proxy and coverage detection unit 214 may provide received application content items to an HTTP server 212 of the MBMS reference client 209.

The policy proxy and coverage detection unit 214 may receive requests for application content items of a service from the application service receiver 216 and may provide application content items conforming to the application service format to the application service receiver 216.

In operation, the policy proxy and coverage detection unit 214 of the MBMS reference client 209 may parse a received USBD and identify information about the service, such as whether application content items of the application service are available from the BMSC server 206 or HTTP server 208, any service area restrictions applicable to the service, any group restrictions applicable to the service, etc.

When a request for an application content is received from the application service receiver 216 at the policy proxy and coverage detection unit 214, the policy proxy and coverage detection unit 214 may select a delivery method for the requested application content based on the information in the USBD and other information (e.g., current service area, current coverage area, group association, etc.) For example, the policy proxy and coverage detection unit 214 may determine that the receiver device 207 is outside a MBMS coverage area and thus may select unicast/broadband delivery for the application content. As another example, the policy proxy and coverage detection unit 214 may determine that the application content is available via both unicast/broadband and multicast/broadcast delivery in restricted service areas based on the USBD. As a further example, the policy proxy and coverage detection unit 214 may determine that the receiver device 207 is not a member of a group authorized to receive multicast/broadcast delivery, and thus may select unicast/broadband delivery of the application content.

The policy proxy and coverage detection unit 214 may determine that the current service area that the receiver device 207 is located in matches a restricted service area listed in the USBD and/or that the current group with which the receiver device 207 is associated matches a restricted group listed in the USBD, and thus may select multicast/broadcast delivery for the application content. When requested application content items are received from the BMSC server 206 or the HTTP server 208, the policy proxy and coverage detection unit 214 may receive the application content items directly from the 3GPP MBMS client 210 or the HTTP server 212, respectively, or may retrieve the application content items from the HTTP server 208. The application content items may then be provided from the policy proxy and coverage detection unit 214 to the application service receiver 216. In this manner, the application service receiver 216 may receive application content items via unicast/broadband or multicast/broadcast without any MBMS delivery method selection logic being required at the application service receiver 216.

Figure 2B:
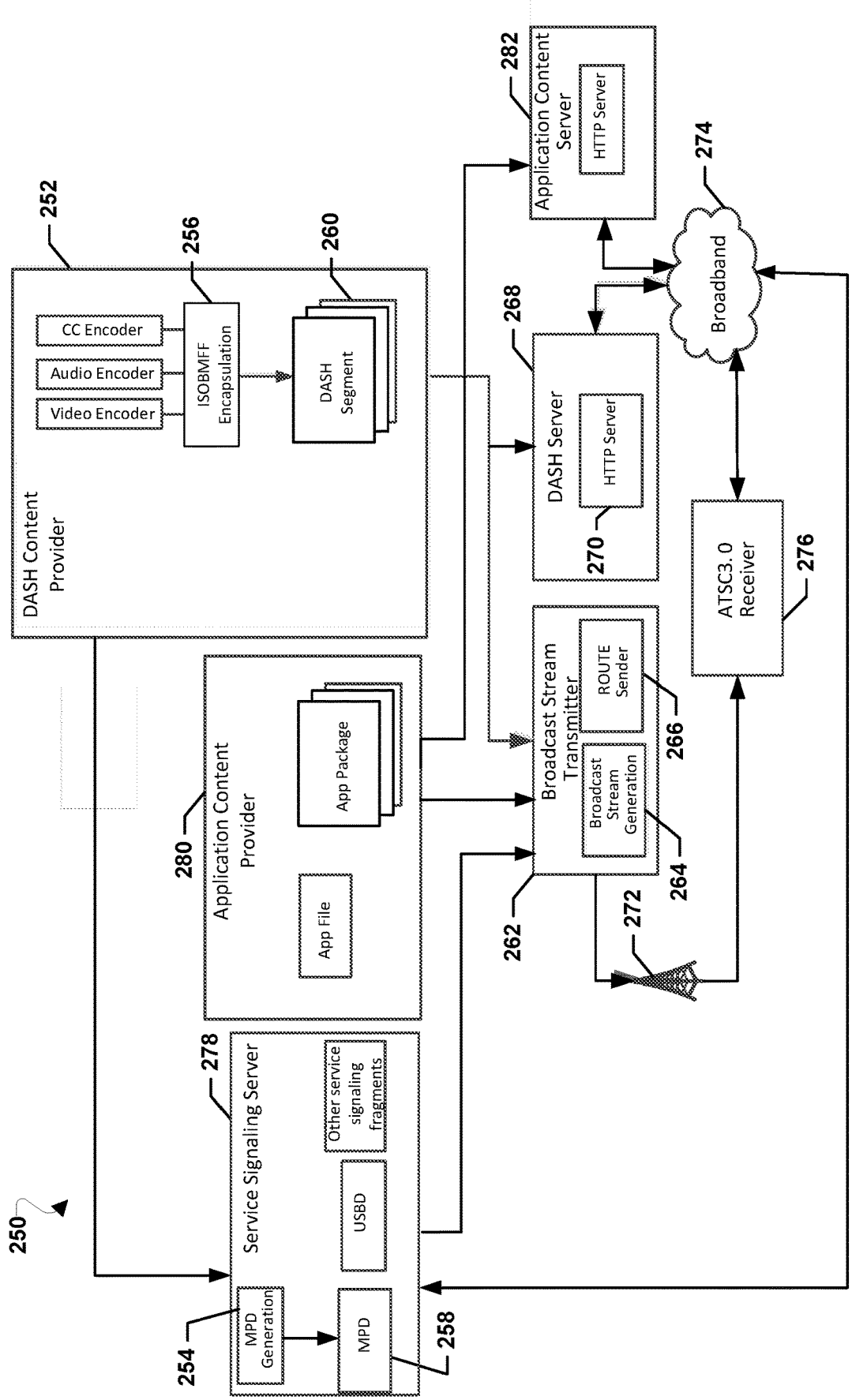
FIG. 2B is a block diagram of components of an ATSC network system suitable for use with the various embodiments.

FIG. 2B illustrates various components of an ATSC 3.0 standard network 250 including a service signaling server 278, an application content provider 280, a DASH content provider 252, a broadcast stream transmitter 262, a DASH server 268, an application content server 282, and a receiver device 276. The receiver device 276 may be capable of receiving content through the ATSC 3.0 standard via various delivery methods, such as unicast/broadband, broadcast, etc. The receiver device 276 may make received linear service content, composed of DASH segments 260, available to application client within the receiver device 276 that consumes the content, such as a DASH player, and acquire application content, such as an application file to be launched and media assets files to be used by the launched application. The DASH content provider 252 may have an International Organization for Standardization base media file format (ISOBMFF) encapsulation unit 256 that takes input from various encoders, such as audio, video, and closed captioning (CC) encoders that encode application content items. The ISOBMFF encapsulation unit 256 may encapsulate the content of the encoders in the ISOBMFF to generate DASH segments 260. The application content provider 280 may provide application content items available for broadcast and/or unicast/broadband reception by the receiver device 276. When delivered over broadcast, the receiver device 276 may obtain the application content items from a broadcast network 272 using a protocol such as FLUTE or ROUTE. When available over unicast/broadband, the receiver device 276 may request the application content items from the application content server 282 using the HTTP protocol.

The service signaling server 278 may contain an MPD generation unit 254 that generates MPDs 258 for the DASH segments 260. The MPDs 258 may include various metadata information about the DASH segments 260. The service signaling server 278 may also produce USBDs which contains metadata describing various content and delivery attributes of the application content items provided by the application content provider 280, as well as other service signaling fragments. The MPDs 258, USBDs, and other service signaling fragments may be transmitted to the receiver device 276 through the broadcast stream transmitter 262. Alternatively, the service signaling data may be accessible via unicast/broadband retrieval form the service signaling server 278.

The DASH content provider 252 may output the DASH segments 260 to either or both the broadcast stream transmitter 262 and the DASH server 268 for delivery to the receiver device 276. The broadcast stream transmitter 262 may include a broadcast stream generator unit 264 for generating a broadcast stream with content that may include a) the DASH segments 260 received from the DASH content provider 252, b) application content items from the application content provider 280, and c) USBDs, MPD, and other service signaling fragments generated by the service signaling server 278. The broadcast stream transmitter 262 may also include a ROUTE sender 266 for transmitting the DASH segments 260 over a ROUTE session. The broadcast stream transmitter 262 may transmit the MPDs 258, the DASH segments 260, USBDs, and other service signaling fragments to the receiver device 276 through a broadcast network 272. The DASH server 268 may include an HTTP server 270 for formatting and transmitting the DASH segments 260 over a unicast/broadband network 274 to the receiver device 276. The receiver device 276 may utilize either the broadcast network 272 or the unicast/broadband network 274 to contact the DASH server 268 and obtain the DASH segments 260. The ATSC 3.0 standard network 250 may include additional components not illustrated in FIG. 2B.

Figure 3:
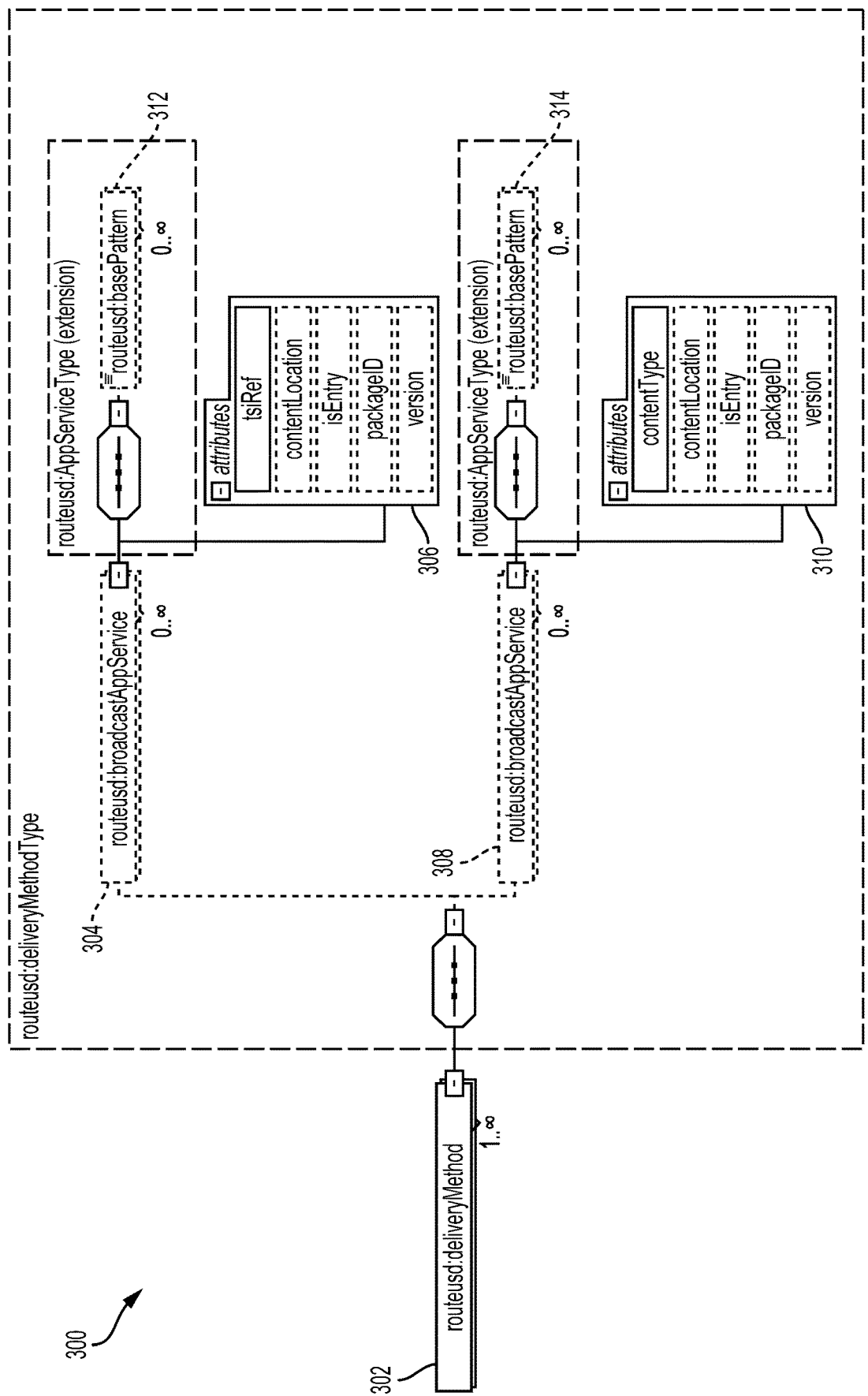
FIG. 3 is a data structure diagram of a user service bundle description according to various embodiments.

FIG. 3 is a data structure diagram of a portion of a USBD 300 according to various embodiments. The USBD 300 is an example of a USBD schema for the ATSC 3.0 A/331 specification. However, the discussion is not limited to the particular USBD schema illustrates, but may be applicable to a variety of USBD schemas. The USBD 300 may describe various delivery and content attributes of an application content item to be delivered from a content server (e.g., the application service encoder 202) to a receiver device (e.g., the application service receiver 216). The USBD 300 may be generated by a network operator server (e.g., the MBMS network operator server 204) and provided to the receiver device so that the receiver device may obtain the application content item through one or more delivery methods (e.g., broadcast, unicast/broadband).

The USBD 300 may include a delivery method element 302 (labeled "deliveryMethod") that specifies a delivery method of the application content, and in the case of broadcast delivery, the Asynchronous Layered Coding (ALC) or layered coding transport (LCT) session or channel in which the application content item is carried. Application content may be delivered in more than one way, so the USBD 300 may include multiple instances of the delivery method element 302. For example, the USBD 300 may include a broadcast delivery element 304 (labeled "broadcastAppService") that is a child element of the delivery method element 302. The broadcast delivery element 304 indicates that the application content may be delivered to a receiver device, for example, through a general broadcast to all receiver devices within a service area. The USBD 300 may include, alternatively or in addition to the broadcast delivery element 304, a unicast delivery element 308 (labeled "unicastAppService") that is a child element of the delivery method element 302. The unicast delivery element 308 indicates that the application content may be delivered to an individual receiver device, for example through a broadband, wired, or wireless communication channel between the server and the receiver device.

Each of the delivery method child elements 304, 308 may be associated with a set of attributes 306, 310 respectively. The sets of attributes 306, 310 may specify content attributes that inform a receiver device on how and where to obtain the application content. For example, the set of attributes 306 for the broadcast delivery element 304 may include an attribute labeled "tsiRef" that identifies a source flow of a layered coding transport (LCT) or ROUTE session for delivering the application content items through a broadcast. The set of attributes 306 may also include an attribute labeled "contentLocation" that specifies the delivery object in a LCT/ROUTE session if the request for application content items was not initiated by an application on the receiver device. If an application on the receiver device requested the application content items, then the delivery object may be specified by the request uniform resource indicator (URI) submitted by the application. Thus, in some embodiments the set of attributes 306 may not include the "contentLocation" attribute.

In case of broadcast delivery of the application content, the set of attributes 306 may also include an attribute labeled "IsEntry" that indicates whether the application content also includes an application launch page or launch file that should be downloaded and launched by the receiver device.

The "IsEntry" attribute may be a Boolean value (i.e., True or False, 1 or 0). The set of attributes 306 may also include an attribute labeled "packageID" that specifies a package identifier if the application content item is part of a content package with multiple content items. The package identifier may be used to identify and group application content items that belong in the same package. The set of attributes 306 may also include an attribute labeled "versionID" that specifies a version identifier of the application content item. The version identifier may be used to, for example, discriminate between different resolutions, encodings, or bit rates of the same media file.

The set of attributes 310 associated with the unicast delivery element 308 may include similar attributes. For example, the set of attributes 310 may include an attribute labeled "contentType" that identifies an Internet media type, or Multimedia Internet Message Extensions (MIME) type of each application content item. For example, the Internet media type may include various textual, graphical, audio, and video file types. The set of attributes 310 may also include an attribute labeled "contentLocation" that specifies the uniform resource indicator (URI) of each application content item. If an application on the receiver device requested the application content, then the set of attributes 310 may not include the "contentLocation" attribute.

In case of broadband or unicast delivery of application content, the set of attributes 310 may also include an attribute labeled "IsEntry" that indicates whether the application content also includes an application launch page or launch file that should be obtained and launched by the receiver device. The "IsEntry" attribute may be a Boolean value (i.e., True or False, 1 or 0). The set of attributes 310 may also include an attribute labeled "packageID" that specifies a package identifier if the application content item is part of a content package with multiple content items. The set of attributes 310 may also include an attribute labeled "versionID" that specifies a version identifier of the application content item. The sets of attributes 306, 310 may include additional attributes not illustrated in FIG. 3, for example as described with reference to FIG. 4B.

The delivery method child elements 304, 308 may also be associated with "basePattern" child elements 312, 314, respectively. The "basePattern", or base pattern, child elements 312, 314 may list a base uniform resource locator (URL) for determination of the delivery method(s) of the associated application content. In some embodiments, the delivery method child elements 304, 308 may have more than one "basePattern" child element representing alternative sources for obtaining the application content. The delivery method child elements 304, 308 may have additional child elements not illustrated in FIG. 3.

Figure 4A:
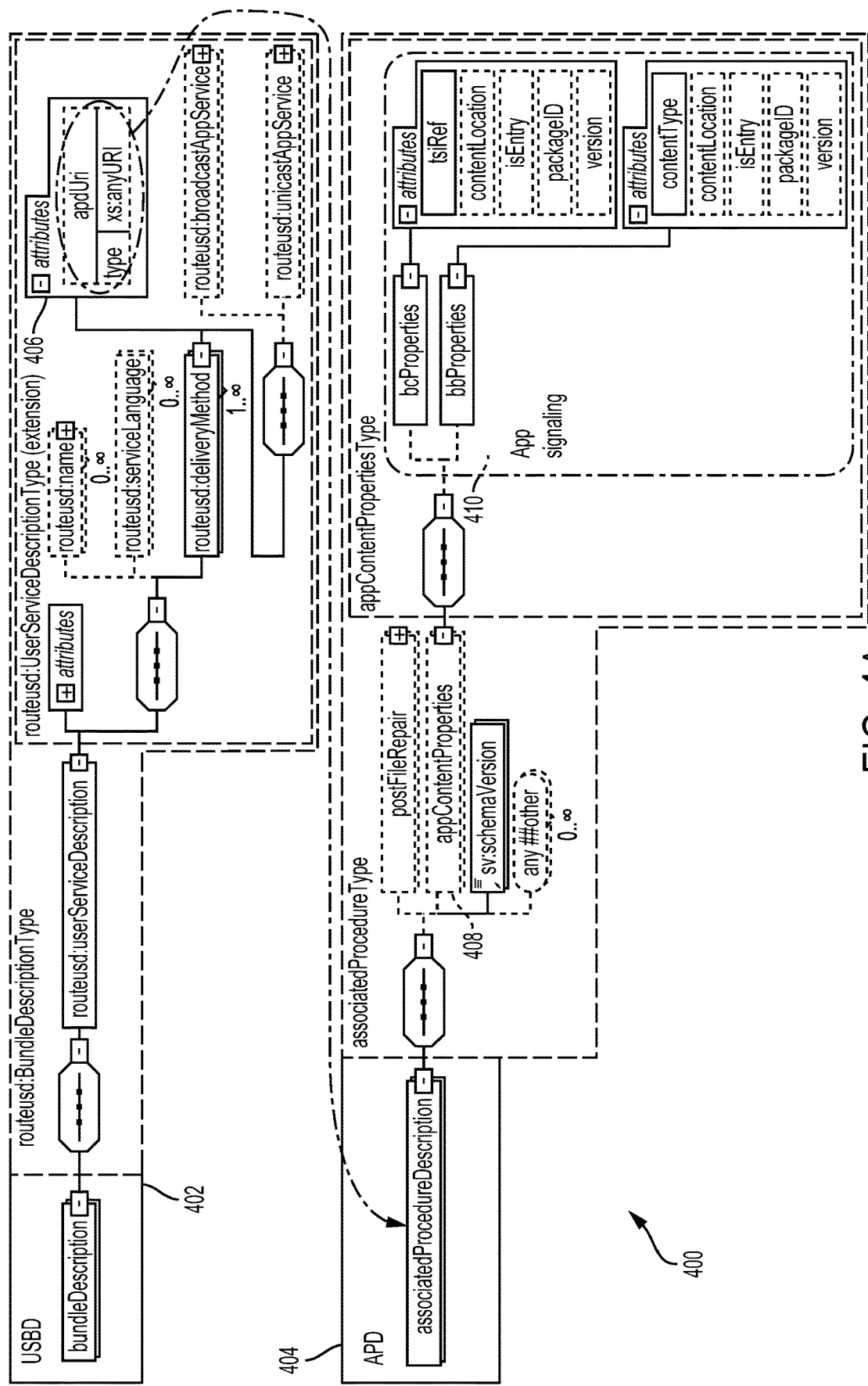
FIG. 4A is a data structure diagram of a configuration of a user service bundle description and an associated procedure description according to various embodiments.
Figure 4B:
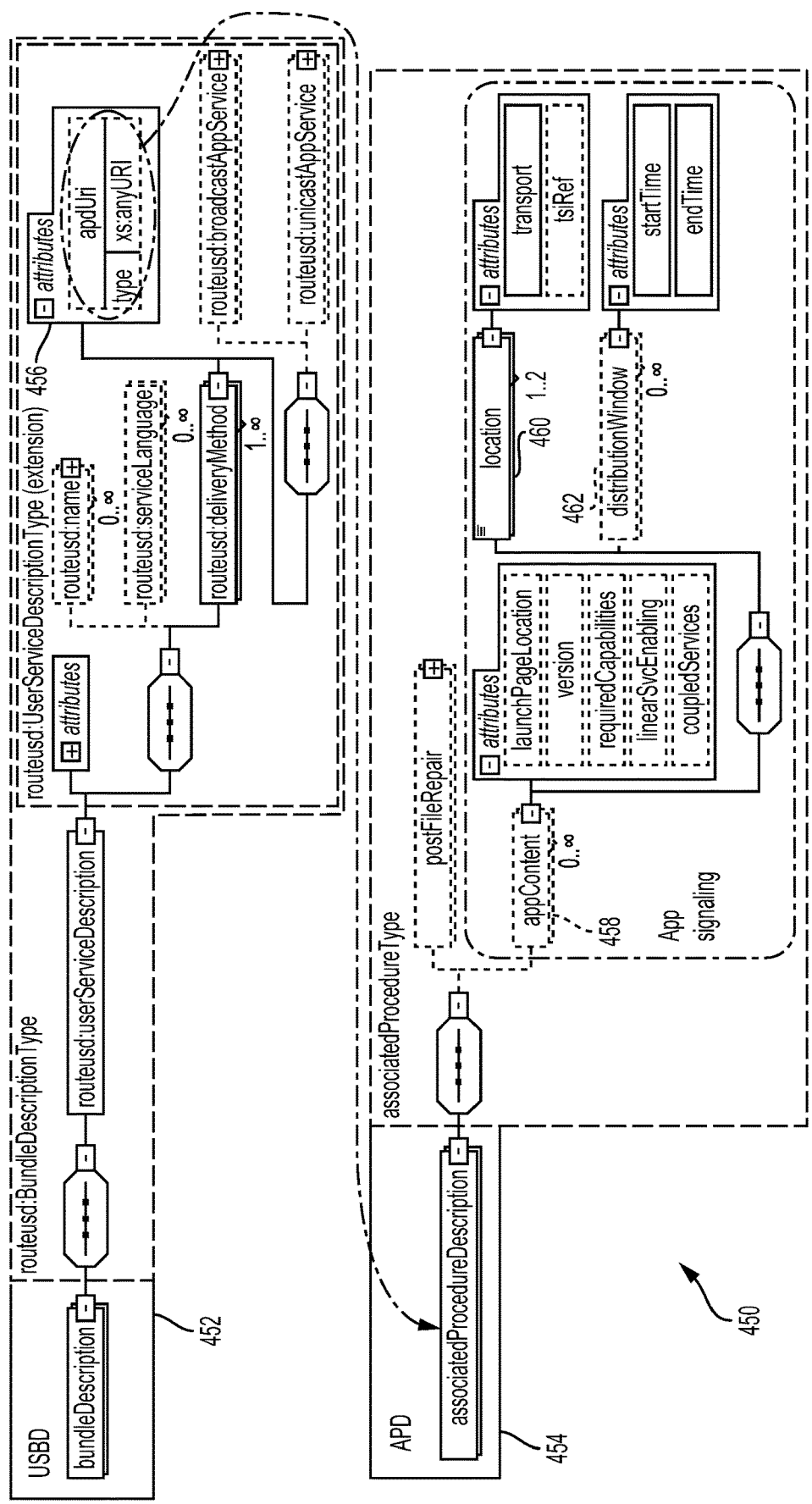
FIG. 4B is a data structure diagram of a second configuration of a user service bundle description and an associated procedure description according to various embodiments.
Figure 4C:
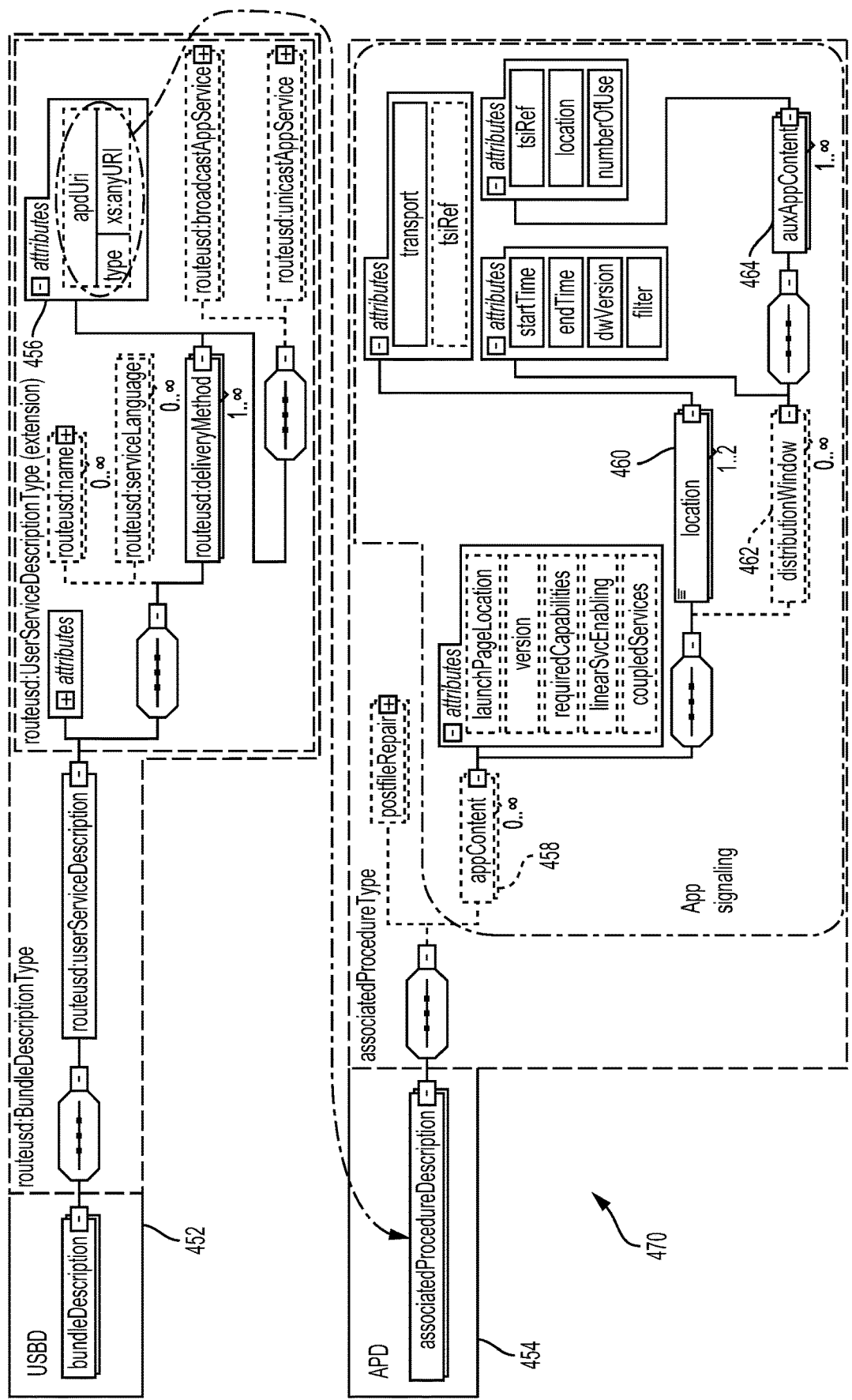
FIG. 4C is a data structure diagram of a third configuration of a user service bundle description and an associated procedure description according to various embodiments.

FIGS. 4A-4C illustrate various data structure diagrams of configurations of a user service bundle description and an associated procedure description according to various embodiments. For example, FIG. 4A illustrates a data structure diagram 400 of a portion of an APD 404 referenced by a USBD 402 according to various embodiments. The APD 404 and the USBD 402 may be delivered to a receiver device through the same FLUTE or ROUTE session. The USBD 402 and the APD 404, combined, may be used for signaling the packaging, delivery and other characteristics of application content associated with a main service (e.g., a ATSC 3.0 service). The USBD 402 may provide basic identification of delivery path information for application content, whereas details regarding acquiring, identifying, and use of application content items may be specified in the APD 404. The USBD 402 may include an apdURI element 406 that references or contains a link to the APD 404. The APD 404 may describe various delivery and content attributes of an application content item to be delivered from a content server (e.g., the application service encoder 202) to a receiver device (e.g., the application service receiver 216). The USBD 402 and the APD 404 may be generated by a network operator server (e.g., the MBMS network operator server 204) and provided to the receiver device so that the receiver device can obtain the application content through one or more delivery methods (e.g., broadcast, unicast/broadband).

The APD 404 may include an application content properties element 408 (labeled "appContentProperties") that specifies application content attributes based on a delivery method of the application content (e.g., unicast or broadcast). Application content may be delivered in more than one way, so the APD 404 may include multiple sets of attributes for each delivery method. For example, the application content properties element 408 may include a set of attributes 410 associated with broadcast delivery of the application content, and a set of attributes 412 associated with unicast/broadcast delivery of the application content. The set of attributes 410, 412 may be similar to the set of attributes 306, 310, respectively, that are described with reference to FIG. 3. The configuration illustrated in the data structure diagram 400 provides a way to keep metadata in the USBD 402 static or fixed, while metadata in the APD 404 may be dynamic. In other words, there is separation of static and dynamic signaling data carried in different metadata fragments.

FIG. 4B illustrates an alternative data structure diagram 450 of a portion of an APD 454 referenced by a USBD 452, according to various embodiments. The APD 454 and the USBD 452 may be delivered to a receiver device through the same FLUTE or ROUTE session. The USBD 402 and the APD 404, combined, may be used for signaling the packaging, delivery and other characteristics of application content associated with a main service (e.g., a ATSC 3.0 service). In contrast to the data structure diagram 400 illustrated in FIG. 4A, all application content signaling is contained in the APD 454. The USBD 452 may include an apdURI element 456 that references or contains a link to the APD 454. The APD 454 may describe various delivery and content attributes of application content to be delivered from a content server (e.g., the application service encoder 202) to a receiver device (e.g., the application service receiver 216). The USBD 452 and the APD 454 may be generated by a network operator server (e.g., the MBMS network operator server 204) and provided to the receiver device so that the receiver device may obtain the application content through one or more delivery methods (e.g., broadcast, unicast/broadband). If the application is a broadcaster application associated with a main service, such an application may be considered as a set of interrelated documents comprising HTML pages and multimedia files, and the launch or entry-point HTML page may be the previous application launch page. This framing may align with terminology used with respect to ATSC for W3C alignment of its runtime environment and application/presentation layer.

The APD 454 may include one or more application content elements 458 (labeled "appContent") that contain attributes that a receiver device may utilize to obtain the application content items according to specific standards (e.g., ATSC 3.0). Each application content element 458 may be associated with a different communications standard or technology.

Each application content element 458 may include a location element 460 (labeled "location") that specifies the URI where the application content item(s) of that instance of application content may be obtained. The location element 460 may also include a transport attribute that specifies the delivery method for the corresponding application content item(s) (e.g., broadcast, unicast/broadband). If the transport attribute indicates that the delivery method is broadcast, the receiver device may determine the ROUTE session or LCT channel that should be used to download the application content items via an attribute that provides the reference to the corresponding Transport Session Identifier or TSI (labeled as "tsiRef"). Subsequently, the receiver device may connect to that session to look for a match in the 'Content-Location' attribute in the Extended File Delivery Table (EFDT), which is similar to the FLUTE's FDT, with the location element 460 of the APD 454 and download the object/file associated with that 'Content-Location' (and linked transport object identifier (TOI) value).

Each application content element 458 may also include one or more optional distribution window elements 462 associated with broadcast delivered pages to allow a broadcaster more flexibility in deciding whether pages may be continuously carouselled, or only broadcast at specific times. The latter option may be beneficial for files that need not be delivered frequently. Auxiliary application content such as multimedia files to be rendered by the application, or other documents to be fetched by the application, may also be delivered during each distribution window instance. This information may be included in child elements of the distribution window elements 462. Examples of such child elements is shown in FIG. 4C, which includes a data structure diagram 470 according to an embodiment. The data structure diagram 470 is similar to the data structure diagram 450 illustrated in FIG. 4B except that the distribution window element 462 has a child element—an auxiliary application content element 464. Each instance of the distribution window element 462 carrying the auxiliary application content element 464 may be defined to occur before the broadcaster application has begun to run. Alternatively, each instance of the distribution window element 462 carrying the auxiliary application content element 464 may be defined to occur after the broadcaster application has begun to run. In either implementation, the distribution window will occur before the application makes a request for the application content sent during that distribution window, thereby allowing the content to be downloaded and stored by the receiver and delivered to the application, upon later request, by the application. The ability to immediately return the requested content in response to a request by the application may result in improved end user experience, such as faster display of interactive media content associated with the application.

Each distribution window element 462 may include start time and end time attributes that specify the start and end times for delivering the application content items to receiver devices. If the current time is outside the start and end times, the receiver device may not obtain the application content items. Each instance of the auxiliary application content element 464 associated with a particular distribution window element 462 may also contain information about the auxiliary application content delivered during that distribution window interval. For example, the auxiliary content element 464 may include identification of the LCT channel or FLUTE/ROUTE session in which that content is carried, as defined by the Transport Session Identifier (TSI), labeled "tsiRef." Additional information contained in the auxiliary application content element 464 may include the resource identifier, in the form of an HTTP-URL of the application content broadcast during that distribution window, labeled "location." This content identifier enables the FLUTE or ROUTE receiver to find the application file object in the FLUTE or ROUTE session to download, by the matching value of the 'Content-Location' attribute in the FLUTE FDT or the ROUTE EFDT. Other information that may be contained in the auxiliary application content element 464 may include the number of times a given auxiliary application content item is expected to be requested for use by the broadcaster application during its execution, labeled "numberOfUse." For example, if a specific video file will be rendered by the application multiple times, the receiver may choose to retain that video file in persistent storage prior to the final request for that content by the application.

The broadcaster (e.g., a server) broadcasting content may include within each distribution window element 462 a version identifier attribute that specifies a version of the distribution window element 462. Multiple distribution window elements that share the same version identifier will transmit the same file or set of files while the distribution window is active. The broadcaster (e.g., a server) broadcasting content may also include within each distribution window element 462 a filter attribute that specifies one or more keywords associated with the auxiliary application content. For example, a broadcaster may provide one or more keywords to the receiver. The one or more keywords may be provided to the receiver via an application programming interface (API). Upon receipt of a distribution window element 462, the receiver processor may compare the one or more keywords specified in the filter attribute with the one or more keywords provided by the broadcaster. If the specified one or more keywords match the provided one or more keywords, the receiver processor may download the corresponding auxiliary application content. If the specified one or more keywords does not match the provided one or more keywords, the receiver processor may not download the corresponding auxiliary application content.

Each application content element 458 may also include a set of attributes, including an optional launch page location (labeled "launchPageLocation") attribute if the application content items include a launch page for the broadcaster application. The launch page location attribute may indicate the HTML page that is the launch, or start page of the application. Each application content element 458 may also include a version attribute that stores the version ID number of the broadcaster application.

Each application content element 458 may also include a required capabilities attribute (labeled "requiredCapabilities") that summarizes the minimum capabilities of the receiver device for executing tasks associated with the associated broadcaster application (e.g. display capabilities, or supported web APIs). Each application content element 458 may also include a linear service enabling attribute (labeled "linearServiceEnabling") that indicates whether the application content includes a media player for rendering media files of the application or whether the receiver device should use a native player on the device to execute the application.

Each application content element 458 may also include a coupled services attribute (labeled "coupledServices") that may be used to inform the receiver device not to delete a broadcaster-provided application upon a channel/service change if the new channel or service also utilizes the same application content items. For example, a broadcaster or station may operate multiple linear services/TV channels in its allocated bandwidth, or even in shared bandwidth with other stations/broadcasters. Services belonging to the same station might may use a single/common broadcaster application, so a change between channels or services belonging to the same station or broadcast does not require deleting the application content items and then re-acquiring the same items. The coupled services attribute may list the set of services sharing the same broadcaster application.

In some embodiments, the APD 454 may not include a package ID attribute because it relates to a transport level artifice. After unpacking the application contents in the package, the package may have no further purpose as compared to the application version ID attribute for identifying the context/versioning of the application/HTML pages carried in the package.

Figure 5:
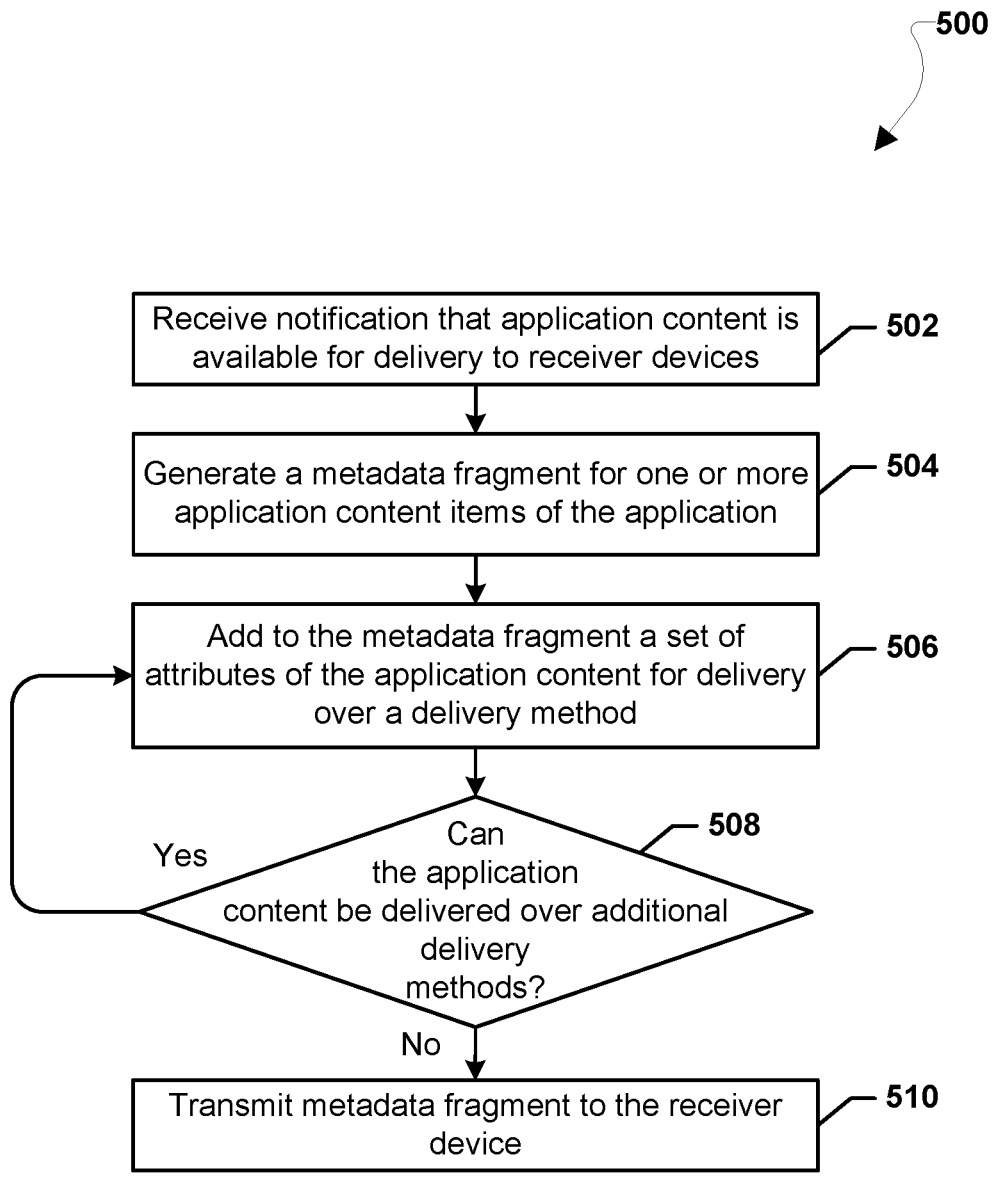
FIG. 5 is a process flow diagram illustrating a method for delivering application content signaling information using a metadata fragment, according to various embodiments.

FIG. 5 illustrates a method 500 for delivering application content signaling information according to various embodiments. The method 500 may be implemented by a service signaling server (e.g., the MBMS network operator server 204, the service signaling server 278, and/or the like) in a communications network (e.g., a MBMS network). The server may be in communication with one or more receiver devices (e.g., the receiver devices 207, 276), which may be various client devices (e.g., mobile devices, desktops, laptops, media devices, large screen TV sets).

In block 502, the server may receive a notification that application content is available for delivery to one or more receiver devices. The notification may be transmitted by an application content server or application service provider that generates the application content. The application content provider or application service provider may be the broadcast service provider. The server may also receive the application content from the application content server or application service provider as well. The application content may be one or more content components delivered as part of an application service, or an application file, media asset, or application package associated with a broadcaster application that is contained in a linear service.

In block 504, the server may generate a metadata fragment for one or more application content items of the application to be acquired by the receiver device. The metadata fragment may be a data structure associated with the application content and describe various delivery and content attributes of the application content to be delivered from an application content server or application service provider (e.g., the application content provider 280), which may be the broadcaster service provider, to the receiver device. For example, the metadata fragment may be a USBD as illustrated in FIG. 3, or an APD that is referenced by a USBD (e.g., through a URI link) as illustrated in FIGS. 4A-4B.

In block 506, the server may add to the metadata fragment a set of attributes of the application content for delivery over a delivery method. For example, the application content may be delivered via broadcast, or unicast/broadband, or both, or through additional delivery methods. Each delivery method of the application content may have an associated set of attributes that enable the receiver device to identify the location and other characteristics of the application content.

For example, if the application content may be delivered via broadcast, the server may create a broadcast delivery method element and a set of attributes in the metadata fragment associated with the broadcast delivery method element. The set of attributes may include a source attribute that identifies a source flow, or transport session identifier, of a LCT or ROUTE session for delivering the application content through a broadcast. The set of attributes may include a content location attribute that specifies the delivery object in a LCT/ROUTE session if the request for an application content was not initiated by an application on the receiver device. The set of attributes may also include an application launch page or launch file indicator which indicates whether the application content also includes an application launch page or launch file that should be obtained and launched by the receiver device. The set of attributes may also include a package ID attribute which specifies a package identifier if the application content item is part of a content package with multiple content items. The set of attributes may also include a version identifier which is used to identify different versions (e.g., different resolutions, encodings, or bit rates of media files, or modified application logic for an application file) of the application content item.

Similarly, if the application content may be delivered via unicast, the server may create a unicast delivery method element and a set of attributes in the metadata fragment associated with the unicast delivery method element. The set of attributes may include a content type attribute that identifies the Internet media type, or MIME type, of each application content. The set of attributes may include a content location attribute that specifies the URI of each application content item. The set of attributes may also include an application launch page or launch file indicator which indicates whether the application content also includes an application launch page or launch file that should be obtained and launched by the receiver device. The set of attributes may also include a package ID attribute which specifies a package identifier if the application content item is part of a content package with multiple content items. The set of attributes may also include a version identifier which is used to identify different versions (e.g., different resolutions, encodings, or bit rates of media files, or modified application logic for an application file) of each application content item.

In some embodiments, if the metadata fragment is an APD then the APD may store an alternate set of attributes as illustrated in FIG. 4B. For example, the APD may include one or more HTML page package elements, each associated with a communications standard or technology. Each HTML page package may include a package location element that specifies the URI where each application content item is located, and a transport attribute that specifies the delivery method (e.g., broadcast, unicast). Each HTML page packet may also include one or more distribution window elements, each one specifying start and end time attributes of time windows when the application content may be downloaded. Each application content element may also include a launch page location attribute that references a launch page for the broadcaster application, the version ID of the application, required attributes of the receiver device for executing the application, a linear service enabler flag, and a list of one or more services that are associated with the application. For example, if the receiver device switches to another service that is on the list of services, the receiver device may reuse the currently acquired application content rather than downloading the same application content again.

In determination block 508, the server may determine whether the application content may be delivered over additional delivery methods for which there is no delivery method element in the metadata fragment. For example, the server may have added a set of attributes to the metadata fragment for delivery of the application content via broadcast. The server may determine that the application content may also be delivered via unicast.

In response to determining that the application content may be delivered over additional delivery methods for which there is no delivery method element in the metadata fragment (e.g., determination block 508="Yes"), the server may add to the metadata fragment a set of attributes of the application content for delivery over the additional delivery method in block 506. In other words, the server may create a delivery method element and add an associated set of attributes for each delivery method of the application content.

In response to determining that the application content may not be delivered over additional delivery methods for which there is no delivery method element in the metadata fragment (e.g., determination block 508="No"), the server may transmit the metadata fragment to the receiver device in block 510. In this manner, the method 500 allows a server to generate and transmit content and delivery attributes of application content to a receiver device so that the receiver device may obtain the application content.

The operations of the method 500 may result in the generation of various different metadata fragments. For example, the following may be an example USBD for application content that includes a launch page or launch file and that is delivered via broadcast:

```
<?xml version="1.0" encoding="UTF-8"?>
<bundleDescription
xmlns="http://www.atsc.org/XMLSchemas/ATSC3/Delivery/
ROUTEUSD/1.0/" xmlns:xsi="http://www.w3.org/2001/XMLSchema-
instance"
xsi:schemaLocation="http://www.atsc.org/XMLSchemas/ATSC3/
Delivery/ROUTEUSD/1.0.xsd">
      <userServiceDescription globalserviceId="http://xbc.com/serviceX/"
serviceId="65535" serviceStatus="true"
....
      <deliveryMethod>
   <broadcastAppService>
      <tsiRef isEntryPt="true">123</tsiRef>
   </broadcastAppService>
      </deliveryMethod>
      </userServiceDescription>
</bundleDescription>
```

Figure 6:
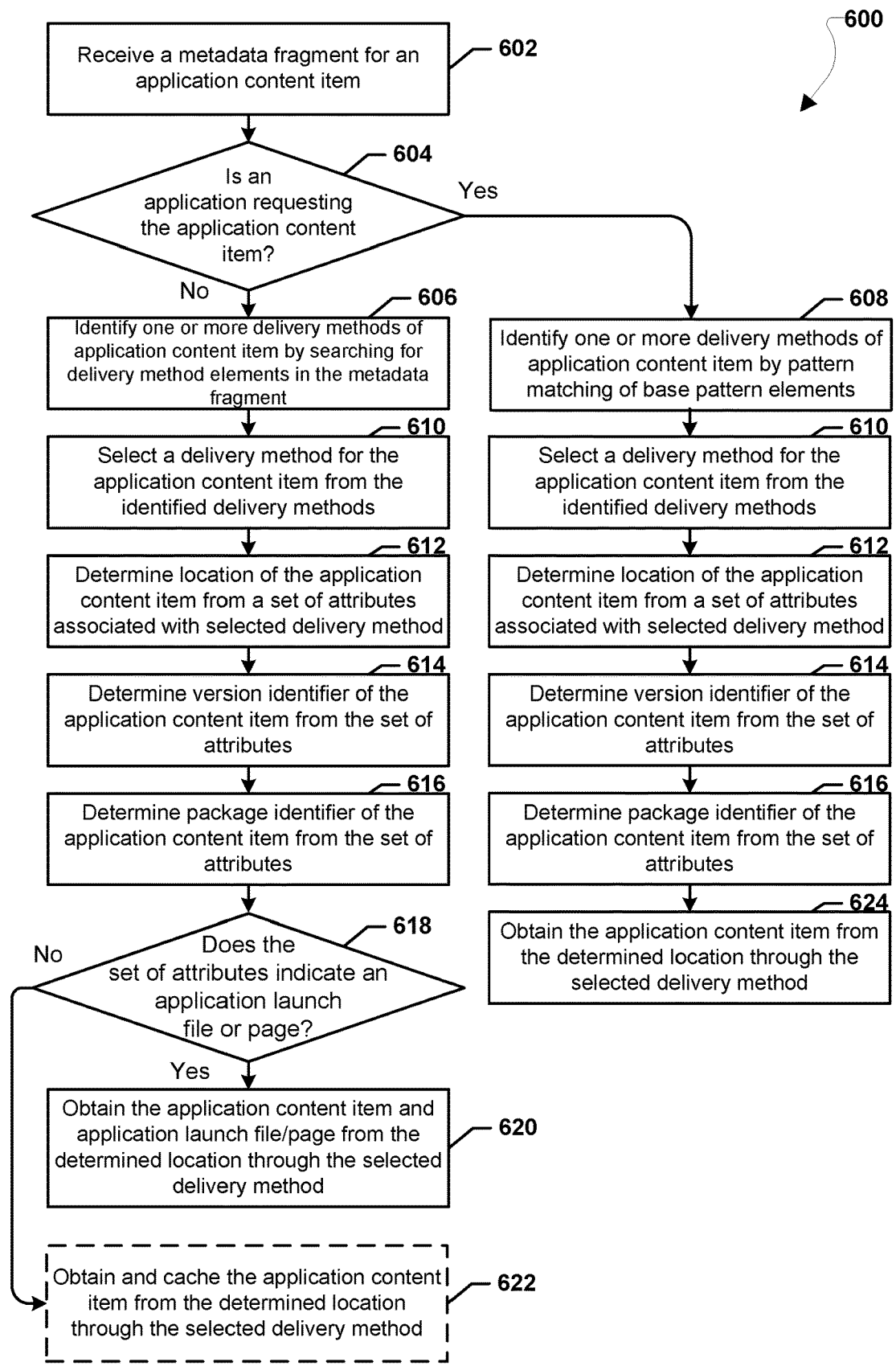
FIG. 6 is a process flow diagram illustrating a method for obtaining application content signaling information from a metadata fragment according to various embodiments.

FIG. 6 illustrates a method 600 for obtaining application content signaling information in a receiver device, using the user service bundle description (USBD) according to various embodiments. The method 600 may be implemented by a processor of a receiver device (e.g., the receiver devices 207, 276) in communication with a service signaling server (e.g., the MBMS network operator server 204, the service signaling server 278, and/or the like) in a communications network (e.g., a MBMS network). The receiver device may be one of various client devices (e.g., mobile devices, desktops, laptops, media devices).

In block 602, the receiver device processor may receive a metadata fragment from the server. The metadata fragment may be a USBD, or an APD referenced by a USBD that is also received from the server. For example, the USBD may have store a URI that points to the location of the APD. The server may have transmitted the metadata fragment to the receiver device in response to a notification from an application content server or application service provider (e.g., the application content provider 280), which may be the broadcaster service provider, that the application content item is ready for delivery to the receiver device. The application content item may be any content component delivered as part of an application service, one or more HTML, pages, or an application file, media asset, or application package associated with a broadcaster application that is contained in a linear service.

As described, the metadata fragment may be a data structure associated with the application content item. The metadata fragment may describe various delivery and content attributes of the application content item to be delivered from the application content server or application service provider to the receiver device. The metadata fragment may include one or more instances of a delivery method element for the application content item. Each delivery method element may indicate a delivery method for the application content item (e.g., broadcast, unicast/broadband). Each delivery method element may include a set of attributes describing various location and content attributes of the application content item for the associated delivery method. For example, the set of attributes may include a location and content type of the application content item, a version identifier or package identifier of the application content item, and an application launch page or launch file indicator.

In determination block 604, the processor may determine whether an application executing on the receiver device requested the application content item. In some instance, an application that is currently executing may have initiated a request for the application content item. In other instances, the request may be sent before an application that utilizes the application content item has initialized (e.g., collecting application content items prior to launch of the application).

In response to determining that no application executing on the receiver device requested the application content item (i.e., determination block 604="No"), the processor may identify one or more delivery methods of the application content item in block 606. The one or more delivery methods may be identified by the presence of the delivery method elements in the metadata fragment. For example, if the broadcast delivery method element is present in the metadata fragment, the application content item may be delivered via broadcast. If the unicast delivery method element is present in the metadata fragment, the application content item may be delivered via unicast. If more than one delivery method is present, the application content item may be delivered via multiple delivery methods.

In response to determining that an application executing on the receiver device requested the application content item (i.e., determination block 604="Yes"), the processor may identify one or more delivery methods of the application content item in block 608. The one or more delivery methods may be identified by pattern matching base pattern elements in the metadata fragment to a request URL generated by the application for acquiring content. Each delivery method element in the metadata fragment may have an associated base pattern child element that may correspond to a base URL for obtaining application content through the respective delivery method.

For example, if the metadata fragment includes a broadcast delivery method element, the processor may compare the base pattern child element of the broadcast delivery method element to the request URL generated by the application. If there is a full match to a contiguous portion of the request URL, it indicates that the application content item may be transmitted via broadcast. If the metadata fragment includes a unicast delivery method element, the processor may compare the base pattern child element of the unicast delivery method element to the request URL generated by the application. If there is a full match to a contiguous portion of the request URL, it indicates that the application content item may be transmitted via unicast. If the metadata fragment includes multiple delivery method elements with base pattern child elements that match the request URL, the application content item may be delivered via multiple delivery methods.

After identifying one or more delivery methods of the application content item in blocks 606 or 608, the processor may select a delivery method of the application content item from the identified delivery methods in block 610. If there is one identified delivery method, then the processor may select that delivery method. If there are multiple identified delivery methods, the processor may select a delivery method based on a number of factors, such as network conditions and packet transfer rates via broadcast or broadband, application or receiver device settings, and user preferences or settings.

In block 612, the processor may determine a location of the application content item from a set of attributes associated with the selected delivery method. The set of attributes associated with the selected delivery method may include one or more attributes that describe the location and/or content type of the application content item. For example, if the selected delivery method is broadcast, the location of the application content item may be indicated by a source attribute in the set of attributes associated with broadcast delivery. The source attribute may identify a source flow of a LCT or ROUTE session for delivering the application content item through a broadcast. If the request for the application content item was not initiated by an application on the receiver device, the location of the application content item may be further indicated by a content location attribute in the set of attributes that specifies the delivery object in a LCT/ROUTE session. The LCT/ROUTE session may be carrying non-real time data.

In another example, if the selected delivery method is unicast/broadband, the location of the application content item may be indicated by a content type attribute in the set of attributes associated with unicast delivery. The content type attribute may identify an Internet media type, or MIME type, of the application content item. If the request for the application content item was not initiated by an application on the receiver device, the location of the application content item may be further indicated by a content location attribute in the set of attributes that specifies the URI of the application content item.

In block 614, the processor may determine a version identifier of the application content item from the set of attributes associated with the selected delivery method. The set of attributes may include a version identifier attribute that may be used to identify different versions (e.g., different resolutions, encodings, or bit rates of media files, or modified application logic for an application file) of the same application content item. For example, there may be a higher resolution and lower resolution version of the same media file. The processor may want to obtain a media file with the same resolution as previously acquired media files.

In block 616, the processor may determine a package identifier of the application content item from the set of attributes associated with the selected delivery method. The set of attributes may include a package identifier attribute that may be used to identify that the application content item belongs to a particular content package (e.g., a collection of related content items that should be obtained and presented together). The processor may be able to group the application content item with other content items having the same package identifier.

If an application executing on the receiver device initiated the request for the application content item (i.e., determination block 604="Yes"), the processor may obtain the application content item from the determined location through the selected delivery method in block 624. For example, if the selected delivery method is broadcast, the processor may obtain the application content item from the LCT/ROUTE session specified by the set of attributes of the broadcast delivery method element. If the selected delivery method is unicast, the processor may obtain the application content item from the URI specified by the set of attributes of the unicast delivery method element. In some embodiments, the processor obtains the application content item and provides it to the application along with the content type information. The application may determine whether or not to utilize the application content item. In alternative embodiments, the application may provide capability information in advance to the processor. The processor may obtain the application content item if the processor determines from the capability information that the application is capable of utilizing the application content item.

If no application executing on the receiver device initiated the request for the application content item (i.e., determination block 604="Yes"), the processor may determine whether the set of attributes of the selected delivery method indicates the application content item includes an application launch page or launch file in determination block 618. The set of attributes may include an application launch page or launch file indicator (e.g., a Boolean flag) that indicates whether the application content item includes an application launch page or launch file that may be delivered as part of the application content item.

The application launch page or launch file may be the entirety of the application content item, or part of a package or compound application content item. For example, in broadcast delivery, if the content type of the application content item is "text/html" the application content item is the application launch page. Alternatively, if the content type of the application content item is "multipart/related," the application launch page or launch file may be the root or first body part of a compound application content item. For unicast delivery, if the content type of the application content item is "text/html" the application content item is the application launch page and may be contained in the payload body of a hypertext transfer protocol (HTTP) 200 response. Alternatively, if the content type of the application content item is "multipart/related," the application launch page or launch file may be the root or first body part of a compound application content item contained in the payload body of the HTTP 200 response.

In response to determining that the set of attributes of the selected delivery method indicates the application content item includes an application launch page or launch file (i.e., determination block 618="Yes"), the processor may obtain the application content item including the application launch page or launch file from the determined location through the selected delivery method in block 620. The processor may initiate the application from the application launch page or launch file, which may then also process any additional obtained content items. In some embodiments, the additional obtained content items may be cached for future use by the launched application.

In some embodiments, the application launch page or launch file and/or certain application content items may be prioritized when transferred to the receiver device. For example, the application launch page or launch file may be delivered through a random access point of a broadcast, whereas the application content items may be delivered through the regular LCT/ROUTE session. This delivery approach may resemble a "data carousel" mechanism established in file delivery systems to repeat object deliveries on a possibly specified time schedule. For example, if a receiver device joins an instance of a broadcast carrier or service, this delivery approach may ensure that the application or certain content items are available to the receiver device within a certain amount of time (e.g., one hour). An example for a data application might be the Electronic Service Guide (ESG) data object that specifies one update per hour.

Figure 8:
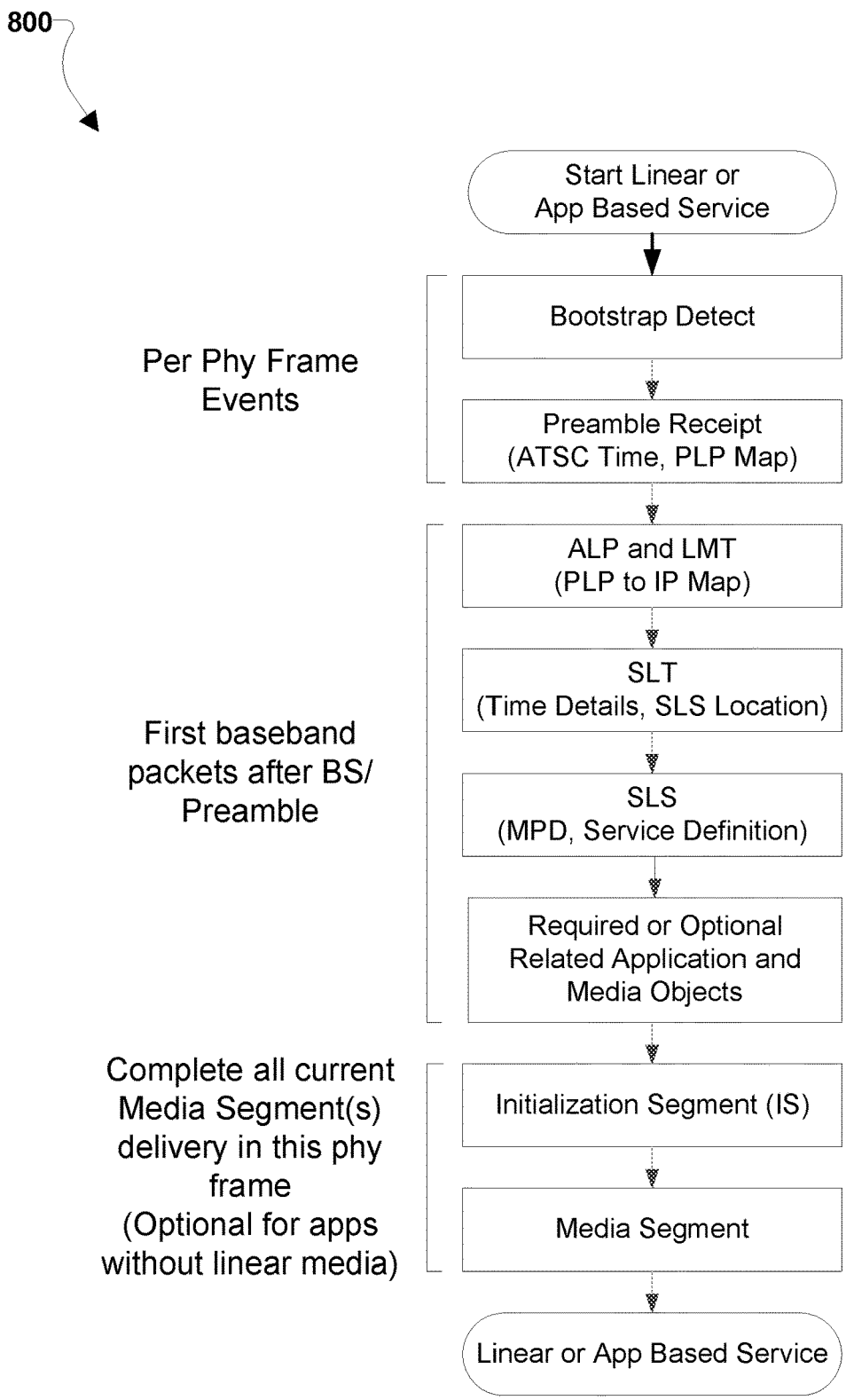
FIG. 8 is a process flow diagram illustrating a method for distributing application content items in temporal correlation with a linear media random access point according to various embodiments.

In the context of delivery of application content items, which are possibly run time application(s) and or other associated media object(s), the delivery of the application content items may be correlated with a linear streaming media service. In particular, there may be a start-up sequence for the linear streaming media service. This start up point is often referred to as a Random Access Point (RAP). FIG. 8 provides an example process flow diagram 800 of application content items being distributed in temporal correlation with the linear media RAP. This approach may have benefits with respect to the service, or channel change time, if the application content items are required in order to start linear streaming service.

As illustrated in FIG. 8, such application content items may receive preferential treatment with respect to time of delivery (i.e., correlated with other signaling or media utilized for linear media service start). These application content items may also optionally receive preferential treatment relative to delivery robustness. The expense for delivering these application content items, in terms of capacity at the physical layer, may be more significant if the total data size is large. Thus, there may be a consideration of whether the combined total delivery data size is reasonable relative to the payload size on a per orthogonal frequency division multiplexing (OFDM) transform basis when total delivery is contained in one or a few physical layer transforms. If the total data size is too large, the application content items may not receive preferential treatment to avoid transmission padding issues.

In response to determining that the set of attributes of the selected delivery method does not indicate the application content item includes an application launch page or launch file (i.e., determination block 618="No"), the processor may obtain and cache the application content item from the determined location through the selected delivery method in optional block 622. Because there is no active application that is ready to use the application content item, the processor may choose to either obtain and cache the application content item for later use, or choose not to obtain it.

In sum, the method 600 allows a receiver device to obtain delivery and content attributes of an application content item in a single transmission of a metadata fragment.

Figure 7:
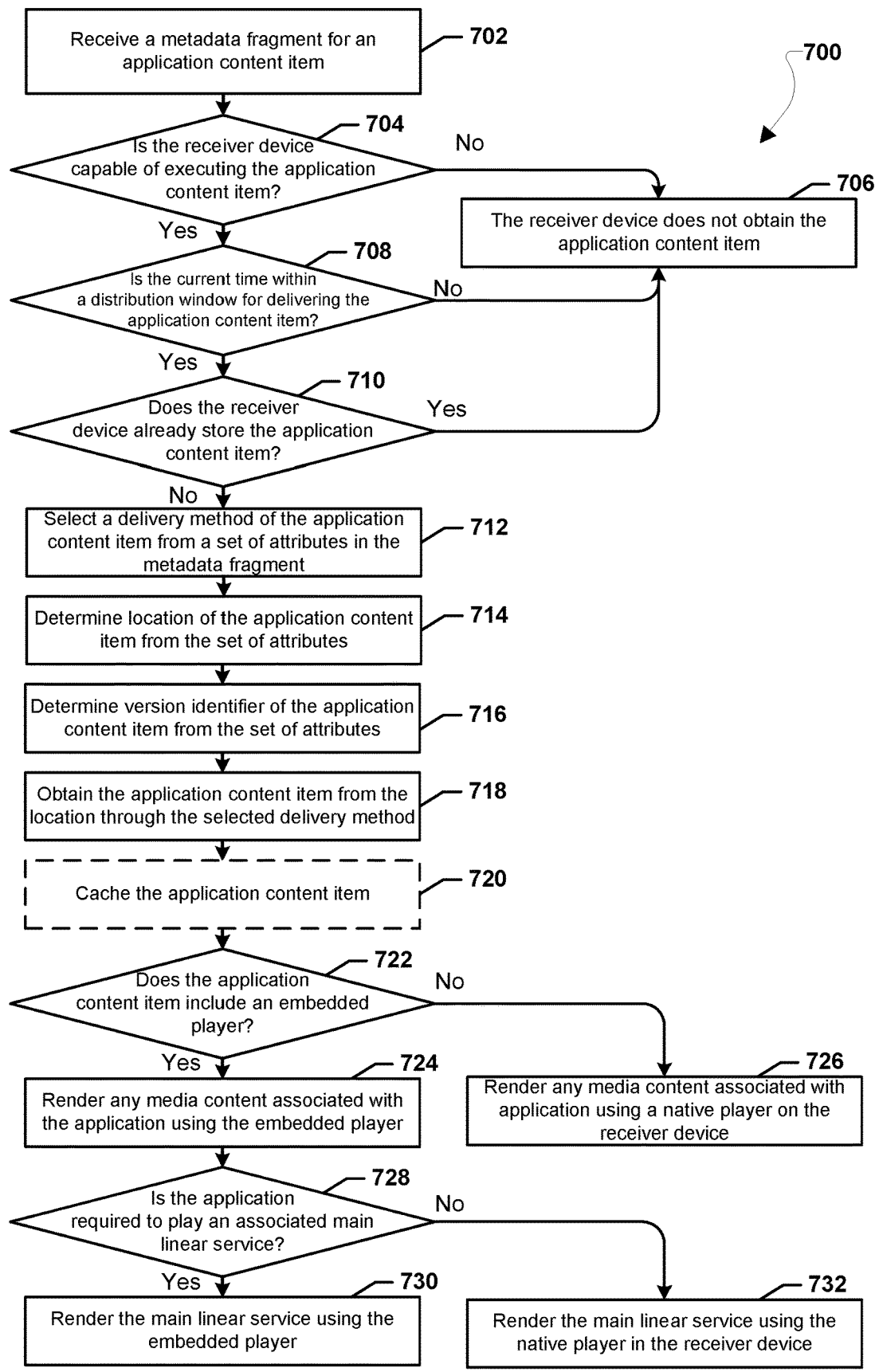
FIG. 7 is a process flow diagram illustrating a method for obtaining application content signaling information from a metadata fragment according to various embodiments.

FIG. 7 illustrates a method 700 for obtaining application content signaling information in a receiver device according to various embodiments. The method 700 may be implemented by a processor of a receiver device (e.g., the receiver devices 207, 276) in communication with a service signaling server (e.g., the MBMS network operator server 204, the service signaling server 278, and/or the like) in a communications network (e.g., a MBMS network). The receiver device may be one of various client devices (e.g., mobile devices, desktops, laptops, media devices, TV sets).

In block 702, the receiver device processor may receive a metadata fragment from the server. The metadata fragment may be an APD referenced by a USBD that is also received from the server. For example, the USBD may have stored a URI that points to the location of the APD. The server may have transmitted the metadata fragment to the receiver device in response to a notification from an application content server or application service provider (e.g., the application content provider 280), which may be the broadcast service provider that application content is ready for delivery to the receiver device. Application content may be any content component delivered as part of an application service, one or more HTML, pages, or an application file, media asset, or application package associated with a broadcaster application that is contained in a linear service.

In determination block 704, the receiver device processor may determine whether the receiver device is capable of executing the application content. The metadata fragment may include a set of attributes that describe various attributes of the application content, such as described with reference to FIG. 4B. One attribute may be a required capability attribute which may specify the minimum requirements of a device in order to execute or display the application content (e.g., minimum memory, CPU, codec, or bandwidth requirements). The receiver device processor may compare the required capability attribute of the application content with the actual capabilities of the receiver device.

In response to determining that the receiver device is not capable of executing or rendering the application content (i.e., determination block 704="No"), the receiver device processor may not obtain the application content in block 706.

In response to determining that the receiver device is capable of executing or rendering the application content (i.e., determination block 704="Yes"), the receiver device processor may determine whether the current time is within a distribution window of broadcasting the application content in determination block 708. The metadata fragment may store one or more distribution window elements that describe time frames during which the application content may be obtained. Each distribution window may be defined by a start time and an end time attribute. Each distribution window may be associated with information about auxiliary application content delivered during that distribution window. The information may include at least one of a transport session identifier (TSI) that identifies a FLUTE or ROUTE session, a resource identifier of the auxiliary application content that matches a content location attribute in a FDT or a EFDT associated with the FLUTE or the ROUTE session, and an indication of a number of times the auxiliary application content is expected to be used by the application.

In response to determining that the current time is not within a distribution window for delivering the application content (i.e., determination block 708="No"), the receiver device processor may not obtain the application content in block 706.

In response to determining that the current time is within a distribution window for delivering the application content (i.e., determination block 708="Yes"), the receiver device processor may determine whether the receiver device already stores the application content in determination block 710. Some services may utilize the same application content. The metadata fragment may include a coupled services attribute that lists the services associated with the application content. If the receiver device switches to another service in the list, then the receiver device does not have to reacquire the application content.

In the event that the delivery method in the metadata fragment indicates the availability of broadcast delivery for the application content, and absence of the distribution window in the metadata fragment, the receiver will expect the application content to be continuously available on the FLUTE or ROUTE session indicated by the transport session identifier reference in the metadata fragment.

In response to determining that the receiver device has already stored the application content (i.e., determination block 710="Yes"), the receiver device processor may not obtain the application content item in block 706.

In response to determining that the receiver device does not already store the application content (i.e., determination block 710="No"), the receiver device processor may select a delivery method of the application content from the set of attributes stored in the metadata fragment in block 712. The metadata fragment may store a transport attribute that specifies the delivery method(s) for the application content (e.g., broadcast, unicast). If there is more than one delivery method, the receiver device processor may select a delivery method according to a default setting or a user selection.

In block 714, the receiver device processor may determine a location of the application content from the set of attributes. The metadata fragment will store a location element that includes a URI pointing to the location of the application content item. If the transport element indicates that the delivery method is broadcast, the receiver device may determine which ROUTE session or LCT channel to download the application content item based on by the transport session identifier reference in the metadata fragment. The referenced ROUTE/LCT session that carries the corresponding application content is identified at the Internet protocol (IP) transport level by the source IP address, destination IP address and destination port number.

In block 716, the receiver device processor may determine a version identifier of the application content item from the set of attributes. The metadata fragment may store a version attribute that indicates the version identifier of the application content item.

In block 718, the receiver device processor may obtain the application content item from the determined location through the selected delivery method. In optional block 720, the receiver device processor may cache the application content item. For example, if the coupled services attribute lists more than one service associated with the application content, then the application content item may be cached if a user switches to another service in the list.

In determination block 722, the receiver device processor may determine whether the application content includes an embedded player. The metadata fragment may include a linear service enabling flag (labeled "linearSvcEnabling") that indicates whether the application content item includes an embedded player (e.g., web browser, media player) for rendering the linear service to which the broadcaster application is associated.

In response to determining that the application content item includes an embedded player (i.e., determination block 722="Yes"), the receiver device processor should render media content associated with the application with the embedded player in block 724. The receiver device processor may then determine whether the application is required to play an associated main linear service in determination block 728. This may also be indicated by the linear service enabling flag. In response to determining that the application is required to play an associated main linear service (i.e., determination block 728="Yes"), the receiver device processor may render the main linear service using the embedded player in block 730. In response to determining that the application is not required to play an associated main linear service (i.e., determination block 728="No"), the receiver device processor may render the main linear service using a native player on the receive device in block 732.

In response to determining that the application content item does not include an embedded player (i.e., determination block 722="No"), the receiver device processor may render media content associated with the application with a native player on the receiver device in block 726.

Figure 9:
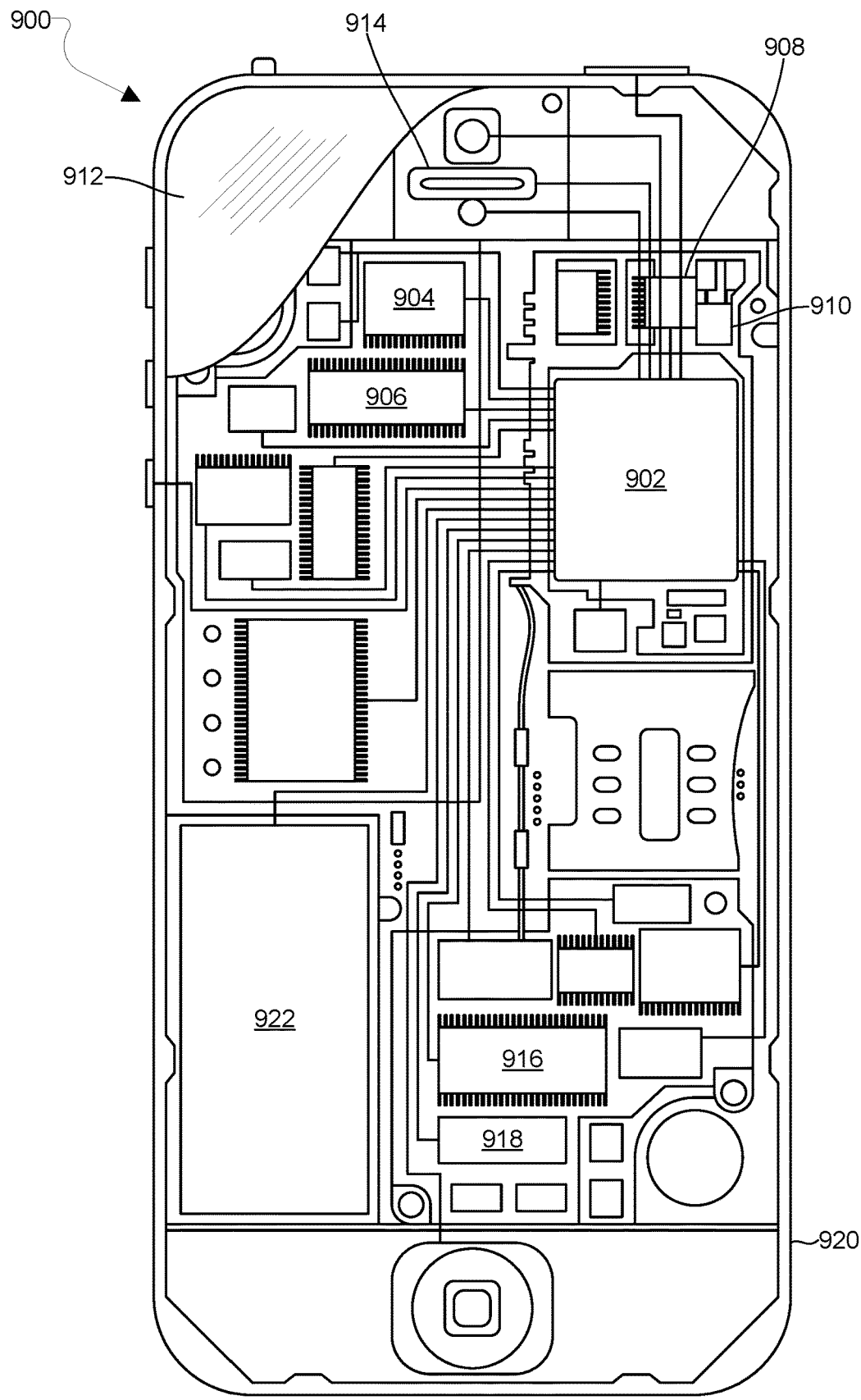
FIG. 9 is a component diagram of an example receiver device suitable for use with the various embodiments.

The various embodiments may be implemented in any of a variety of receiver devices, an example of which is illustrated in FIG. 9. For example, the receiver device 900 may include a processor 902 coupled to internal memories 904 and 906. Internal memories 904 and 906 may be volatile or non-volatile memories, and may also be secure and/or encrypted memories, or unsecure and/or unencrypted memories, or any combination thereof. The processor 902 may also be coupled to a touch screen display 912, such as a resistive-sensing touch screen, capacitive-sensing touch screen infrared sensing touch screen, or the like. Additionally, the display of the receiver device 900 need not have touch screen capability. The receiver device 900 may include a network interface in the form of a wireless transceiver 908, a cellular network wireless modem chip 916, and/or a wired connection interface 918 configured to receive communications from a server according to various embodiments. The receiver device 900 may have one or more radio signal transceivers 908 (e.g., Peanut®, Bluetooth®, Zigbee®, Wi-Fi, radio frequency (RF) radio) and antennae 910, for sending and receiving communications via a wireless network, coupled to each other and/or to the processor 902. The receiver device 900 may include a cellular network wireless modem chip 916 that enables communication via a cellular data network (e.g., CDMA, TDMA, GSM, 3G, 4G, LTE, or any other type of cellular data network) and is coupled to the processor 902. The receiver device 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port. The receiver device 900 may also include speakers 914 for providing audio outputs. The receiver device 900 may also include a housing 920, constructed of a plastic, metal, or a combination of materials, for containing all or some of the components discussed herein. The receiver device 900 may include a power source 922 coupled to the processor 902, such as a disposable or rechargeable battery. The rechargeable battery may also be coupled to the peripheral device connection port to receive a charging current from a source external to the receiver device 900.

Figure 10:
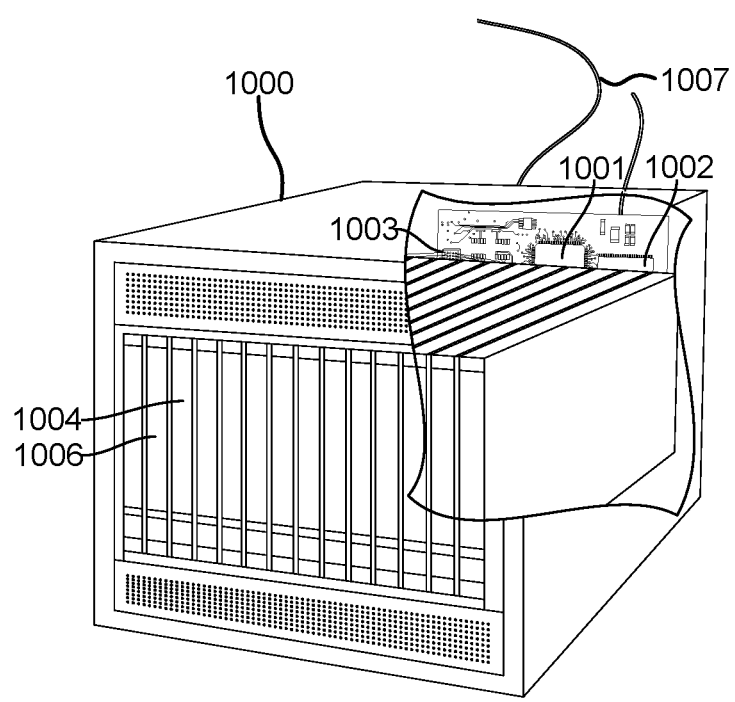
FIG. 10 is a component diagram of an example server suitable for use with the various embodiments.

The various embodiments may also be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1004. The server 1000 may also include a floppy disc drive, compact disc (CD) or digital versatile disc (DVD) disc drive 1006 coupled to the processor 1001. The server 1000 may also include network access ports 1003 coupled to the processor 1001 for establishing network interface connections with a network 1007, such as a local area network coupled to other broadcast system computers and servers, the Internet, the public switched telephone network, and/or a cellular data network (e.g., CDMA, TDMA, GSM, 3G, 4G, LTE, or any other type of cellular data network).

The processors 902 and 1001 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 904, 906, 1002, 1004 before they are accessed and loaded into the processors 902 and 1001. The processors 902 and 1001 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 902 and 1001 including internal memory or removable memory plugged into the device and memory within the processor 902 and 1001 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, units, circuits, and algorithm steps described in connection with the embodiments disclosed herein may be implemented as electronic hardware, computer software, or combinations of both. To clearly illustrate this interchangeability of hardware and software, various illustrative components, blocks, units, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software unit which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include random access memory (RAM), read only memory (ROM), electrically erasable programmable ROM (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes CD, laser disc, optical disc, DVD, floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to other embodiments without departing from the spirit or scope of the various embodiments. Thus, the various embodiments are not intended to be limited to the embodiments shown herein but is to be accorded the widest scope consistent with the following claims and the principles and novel features disclosed herein.

What is claimed is:

1. A method for delivering application content signaling information, comprising:
   generating, by a processor of a server, a metadata fragment for one or more application content items of an application to be acquired by a receiver device;
   adding, by the processor, to the metadata fragment a first set of attributes including an indication that rendering of a linear service or a group of linear services to which the application is associated is performed by a media player embedded in the application; and
   transmitting, by the processor, the metadata fragment to the receiver device.

2. The method of claim 1, wherein the first set of attributes further includes an application launch page or launch file indicator for the application.

3. The method of claim 1, wherein the first set of attributes further includes an indication of required capabilities for rendering the application and its associated one or more application content items.

4. The method of claim 1, wherein:
   the first set of attributes further includes a start time and an end time for at least one distribution window for the application; and the at least one distribution window is associated with information about auxiliary application content delivered during the at least one distribution window.

5. The method of claim 4, wherein the information about auxiliary application content delivered during the at least one distribution window includes a version identifier for that distribution window and at least one filter term associated with each application content delivered during the at least one distribution window.

6. The method of claim 5, wherein the application content delivered during the at least one distribution window with the same version is identical.

7. A method for obtaining application content signaling information, comprising:
receiving, by a processor of a receiver device, a metadata fragment for an application content item associated with an application, wherein the metadata fragment comprises a set of attributes;
determining, by the processor, whether the application content item includes an embedded player from the set of attributes;
obtaining, by the processor, the application content item; and
rendering, by the processor, media content associated with the application content item using the embedded player in response to determining that the application content item includes the embedded player.

8. The method of claim 7, further comprising:
rendering, by the processor, media content associated with the application content item using a native player on the receiver device in response to determining that the application content item does not include the embedded player.

9. The method of claim 7, further comprising:
determining, by the processor, whether the application is required to play an associated linear service;
rendering, by the processor, a main linear service using the embedded player in response to determining that the application is required to play the associated linear service; and
rendering, by the processor, the main linear service using a native player on the receiver device in response to determining that the application is not required to play the associated linear service.

10. The method of claim 7, further comprising:
determining, by the processor, whether the receiver device is capable of executing the application content item based on the set of attributes; and
not obtaining, by the processor, the application content item in response to determining that the receiver device is not capable of executing the application content item.

11. The method of claim 7, further comprising:
determining, by the processor, whether the attributes of the metadata fragment comprises at least one distribution window for the application; and
in response to determining the attributes of the metadata fragment comprises at least one distribution window for the application:
determining, by the processor, whether the at least one distribution window is associated with a start time and an end time; and
determining, by the processor, whether the at least one distribution window is associated with information about auxiliary application content delivered during the at least one distribution window.

12. The method of claim 11, wherein the information about auxiliary application content delivered during the at least one distribution window includes a version identifier for that distribution window and at least one filter term associated with each application content delivered during the at least one distribution window.

13. The method of claim 12, further comprising:
in response to determining, by the processor, that the at least one filter term associated with each application content delivered during the at least one distribution window matches the at least one filter term locally available to the processor:
downloading and storing, by the processor, the corresponding auxiliary application content delivered during the at least one distribution window; and
obtaining, by the processor, the at least one locally available filter term by invoking an application programming interface exposed by a processor of a server.

14. The method of claim 12, further comprising:
disregarding, by the processor, the corresponding auxiliary application content delivered during the at least one distribution window in response to determining that none of the at least one filter term associated with each application content delivered during the at least one distribution window matches any one of the at least one filter term locally available to the processor.

15. The method of claim 12, further comprising:
in response to determining, by the processor and for a given version identifier of the at least one distribution window, that a filter term matching procedure for deciding whether or not to download and store the auxiliary application content delivered during the at least one distribution window has been performed:
ignoring, by the processor, any other instances of the distribution window associated with the same version identifier; and
performing, by the processor, the filter term matching procedure for deciding whether or not to download and store the auxiliary application content delivered during the at least one distribution window associated with a different version identifier.

16. A server, comprising:
a network interface; and
a processor coupled to the network interface and configured with processor-executable instructions to perform operations comprising:
generating a metadata fragment for one or more application content items of an application to be acquired by a receiver device;
adding to the metadata fragment a first set of attributes of application content including an indication that rendering of a linear service or a group of linear services to which the application is associated is performed by a media player embedded in the application; and
transmitting the metadata fragment to the receiver device.

17. The server of claim 16, wherein the processor is configured with processor-executable instructions to perform operations such that the first set of attributes further includes an application launch page or launch file indicator for the application.

18. The server of claim 16, wherein the processor is configured with processor-executable instructions to perform operations such that the first set of attributes further includes an indication of required capabilities for rendering the application and its associated one or more application content items.

19. The server of claim 16, wherein the processor is configured with processor-executable instructions to perform operations such that:
the first set of attributes further includes a start time and an end time for at least one distribution window for the application content; and
at least one distribution window is associated with information about auxiliary application content delivered during the at least one distribution window.

20. The server of claim 19, wherein the processor is configured with processor-executable instructions to perform operations such that the information about auxiliary application content delivered during the at least one distribution window includes a version identifier for that distribution window and at least one filter term associated with each application content delivered during the at least one distribution window.

21. The server of claim 20, wherein the processor is configured with processor-executable instructions to perform operations such that the application content delivered during the at least one distribution window with the same version is identical.

22. A server, comprising:
means for generating a metadata fragment for one or more application content items of an application to be acquired by a receiver device;
means for adding to the metadata fragment a first set of attributes for application content including an indication that rendering of a linear service or a group of linear services to which the application is associated is performed by a media player embedded in the application; and
means for transmitting the metadata fragment to the receiver device.

23. The server of claim 22, wherein the first set of attributes further includes an application launch page or launch file indicator for the application.

24. The server of claim 22, wherein the first set of attributes further includes an indication of required capabilities for rendering the application and its associated one or more application content items.

25. The server of claim 22, wherein:
the first set of attributes further includes a start time and an end time for at least one distribution window for the application content; and
the at least one distribution window is associated with information about auxiliary application content delivered during the at least one distribution window.

26. The server of claim 25, wherein the information about auxiliary application content delivered during the at least one distribution window includes a version identifier for that distribution window and at least one filter term associated with each application content delivered during the at least one distribution window.

27. The server of claim 26, wherein the application content delivered during the at least one distribution window with the same version is identical.

28. A non-transitory processor-readable storage medium having stored thereon server-executable instructions configured to cause a server to perform operations comprising:
generating a metadata fragment for one or more application content items of an application to be acquired by a receiver device;
adding to the metadata fragment a first set of attributes including an indication that rendering of a linear service or a group of linear services to which the application is associated is performed by a media player embedded in the application; and
transmitting the metadata fragment to the receiver device.

29. The non-transitory processor-readable storage medium of claim 28, wherein the stored server-executable instructions are configured to cause the server to perform operations such that the first set of attributes further includes an application launch page or launch file indicator for the application.

30. The non-transitory processor-readable storage medium of claim 28, wherein the stored server-executable instructions are configured to cause the server to perform operations such that the first set of attributes further includes an indication of required capabilities for rendering the application and its associated one or more application content items.

31. The non-transitory processor-readable storage medium of claim 28, wherein the stored server-executable instructions are configured to cause the server to perform operations such that:
the first set of attributes further includes a start time and an end time for at least one distribution window for the application; and
the at least one distribution window is associated with information about auxiliary application content delivered during the at least one distribution window.

32. The non-transitory processor-readable storage medium of claim 31, wherein the stored server-executable instructions are configured to cause the server to perform operations such that the information about auxiliary application content delivered during the at least one distribution window includes a version identifier for that distribution window and at least one filter term associated with each application content delivered during the at least one distribution window.

33. The non-transitory processor-readable storage medium of claim 32, wherein the stored server-executable instructions are configured to cause the server to perform operations such that the application content delivered during the at least one distribution window with the same version is identical.

34. A receiver device, comprising:
a network interface; and
a processor coupled to the network interface and configured with processor-executable instructions to perform operations comprising:
receiving a metadata fragment for an application content item associated with an application, wherein the metadata fragment comprises a set of attributes;
determining whether the application content item includes an embedded player from the set of attributes;
obtaining the application content item; and
rendering media content associated with the application content item using the embedded player in response to determining that the application content item includes the embedded player.

35. The receiver device of claim 34, wherein the processor is configured with processor-executable instructions to perform operations further comprising:
rendering media content associated with the application content item using a native player on the receiver device in response to determining that the application content item does not include the embedded player.

36. The receiver device of claim 34, wherein the processor is configured with processor-executable instructions to perform operations further comprising:

determining whether the application is required to play an associated linear service;

rending a main linear service using the embedded player in response to determining that the application is required to play the associated linear service; and rendering the main linear service using a native player on the receiver device in response to determining that the application is not required to play the associated linear service.

37. The receiver device of claim 34, wherein the processor is configured with processor-executable instructions to perform operations further comprising:

determining whether the receiver device is capable of executing the application content item based on the set of attributes; and not obtaining the application content item in response to determining that the receiver device is not capable of executing the application content item.

38. The receiver device of claim 34, wherein the processor is configured with processor-executable instructions to perform operations further comprising:

determining whether a current time is within a distribution window for delivering the application content item from the set of attributes; and not obtaining the application content item in response to determining that the current time is not within a distribution window for delivering the application content item.

39. The receiver device of claim 34, wherein the processor is configured with processor-executable instructions to perform operations further comprising:

determining whether the attributes of the metadata fragment comprise at least one distribution window for the application; and in response to determining the attributes of the metadata fragment comprise at least one distribution window for the application:

determining whether the at least one distribution window is associated with a start time and an end time; and determining whether the at least one distribution window is associated with information about auxiliary application content delivered during the at least one distribution window.

40. The receiver device of claim 39, wherein the information about auxiliary application content delivered during the at least one distribution window includes a version identifier for that distribution window and at least one filter term associated with each application content delivered during the at least one distribution window.

41. The receiver device of claim 40, wherein the processor is configured with processor-executable instructions to perform operations further comprising:

in response to determining that the at least one filter term associated with each application content delivered during the at least one distribution window matches the at least one filter term locally available to the processor:

downloading and storing the corresponding auxiliary application content delivered during the at least one distribution window; and obtaining the at least one locally available filter term by invoking an application programming interface exposed by a processor of a server.

42. The receiver device of claim 40, wherein the processor is configured with processor-executable instructions to perform operations further comprising:

disregarding the corresponding auxiliary application content delivered during the at least one distribution window in response to determining that none of the at least one filter term associated with each application content delivered during the at least one distribution window matches any one of the at least one filter term locally available to the processor.

43. The receiver device of claim 40, wherein the processor is configured with processor-executable instructions to perform operations further comprising:

in response to determining, for a given version identifier of the at least one distribution window, that a filter term matching procedure for deciding whether or not to download and store the auxiliary application content delivered during the at least one distribution window has been performed:

ignoring any other instances of the distribution window associated with the same version identifier; and performing the filter term matching procedure for deciding whether or not to download and store the auxiliary application content delivered during the at least one distribution window associated with a different version identifier.

44. A receiver device, comprising:

means for receiving a metadata fragment for an application content item associated with an application, wherein the metadata fragment comprises a set of attributes;

means for determining whether the application content item includes an embedded player from the set of attributes;

means for obtaining the application content item; and means for rendering media content associated with the application content item using the embedded player in response to determining that the application content item includes the embedded player.

45. The receiver device of claim 44, further comprising:

means for rendering media content associated with the application content item using a native player on the receiver device in response to determining that the application content item does not include the embedded player.

46. The receiver device of claim 44, further comprising:

means for determining whether the application is required to play an associated linear service;

means for rending a main linear service using the embedded player in response to determining that the application is required to play the associated linear service; and means for rendering the main linear service using a native player on the receiver device in response to determining that the application is not required to play the associated linear service.

47. The receiver device of claim 44, further comprising:

means for determining whether the receiver device is capable of executing the application content item based on the set of attributes; and means for not obtaining the application content item in response to determining that the receiver device is not capable of executing the application content item.

48. The receiver device of claim 44, further comprising:

means for determining whether a current time is within a distribution window for delivering the application content item from the set of attributes; and means for not obtaining the application content item in response to determining that the current time is not within a distribution window for delivering the application content item.

49. The receiver device of claim 44, further comprising:
means for determining whether the attributes of the metadata fragment include at least one distribution window for the application;
means for determining whether the at least one distribution window is associated with a start time and an end time in response to determining the attributes of the metadata fragment comprise at least one distribution window for the application; and
means for determining whether the at least one distribution window is associated with information about auxiliary application content delivered during the at least one distribution window.

50. The receiver device of claim 49, wherein the information about auxiliary application content delivered during the at least one distribution window includes a version identifier for that distribution window and at least one filter term associated with each application content delivered during the at least one distribution window.

51. The receiver device of claim 50, further comprising:
means for downloading and storing the corresponding auxiliary application content delivered during the at least one distribution window in response to determining that the at least one filter term associated with each application content delivered during the at least one distribution window matches the at least one filter term locally available to the receiver device; and
means for obtaining the at least one locally available filter term by invoking an application programming interface exposed by a processor of a server.

52. The receiver device of claim 50, further comprising:
means for disregarding the corresponding auxiliary application content delivered during the at least one distribution window response to determining that none of the at least one filter term associated with each application content delivered during the at least one distribution window matches any one of the at least one filter term locally available to the receiver device.

53. The receiver device of claim 50, further comprising:
means for ignoring any other instances of the distribution window associated with the same version identifier to determining, for a given version identifier of the at least one distribution window, that a filter term matching procedure for deciding whether or not to download and store the auxiliary application content delivered during the at least one distribution window has been performed; and
means for performing the filter term matching procedure for deciding whether or not to download and store the auxiliary application content delivered during the at least one distribution window associated with a different version identifier.

54. A non-transitory processor-readable storage medium having stored thereon receiver-executable instructions configured to cause a receiver device to perform operations comprising:
receiving a metadata fragment for an application content item associated with an application, wherein the metadata fragment comprises a set of attributes;
determining whether the application content item includes an embedded player from the set of attributes;
obtaining the application content item; and
rendering media content associated with the application content item using the embedded player in response to determining that the application content item includes the embedded player.

55. The non-transitory processor-readable storage medium of claim 54, wherein the stored receiver-executable instructions are configured to cause the receiver device to perform operations further comprising:
rendering media content associated with the application content item using a native player on the receiver device in response to determining that the application content item does not include the embedded player.

56. The non-transitory processor-readable storage medium of claim 54, wherein the stored receiver-executable instructions are configured to cause the receiver device to perform operations further comprising:
determining whether the application is required to play an associated linear service;
rending a main linear service using the embedded player in response to determining that the application is required to play the associated linear service; and
rendering the main linear service using a native player on the receiver device in response to determining that the application is not required to play the associated linear service.

57. The non-transitory processor-readable storage medium of claim 54, wherein the stored receiver-executable instructions are configured to cause the receiver device to perform operations further comprising:
determining whether the receiver device is capable of executing the application content item based on the set of attributes; and
not obtaining the application content item in response to determining that the receiver device is not capable of executing the application content item.

58. The non-transitory processor-readable storage medium of claim 54, wherein the stored receiver-executable instructions are configured to cause the receiver device to perform operations such that:
determining whether a current time is within a distribution window for delivering the application content item from the set of attributes; and
not obtaining the application content item in response to determining that the current time is not within a distribution window for delivering the application content item.

59. The non-transitory processor-readable storage medium of claim 54, wherein the stored receiver-executable instructions are configured to cause the receiver device to perform operations further comprising:
determining whether the attributes of the metadata fragment comprises at least one distribution window for the application; and
in response to determining the attributes of the metadata fragment comprise at least one distribution window for the application:
determining whether the at least one distribution window is associated with a start time and an end time; and
determining whether the at least one distribution window is associated with information about auxiliary application content delivered during the at least one distribution window.

60. The non-transitory processor-readable storage medium of claim 59, wherein the information about auxiliary application content delivered during the at least one distribution window includes a version identifier for that distribution window and at least one filter term associated with each application content delivered during the at least one distribution window.

61. The non-transitory processor-readable storage medium of claim 60, wherein the stored receiver-executable instructions are configured to cause the receiver device to perform operations further comprising:
in response to determining that the at least one filter term associated with each application content delivered during the at least one distribution window matches the at least one filter term locally available to the receiver device;
downloading and storing the corresponding auxiliary application content delivered during the at least one distribution window; and
obtaining the at least one locally available filter term by invoking an application programming interface exposed by a processor of a server.

62. The non-transitory processor-readable storage medium of claim 60, wherein the stored receiver-executable instructions are configured to cause the receiver device to perform operations further comprising:
disregarding the corresponding auxiliary application content delivered during the at least one distribution window in response to determining that none of the at least one filter term associated with each application content delivered during the at least one distribution window matches any one of the at least one filter term locally available to the processor.

63. The non-transitory processor-readable storage medium of claim 60, wherein the stored receiver-executable instructions are configured to cause the receiver device to perform operations further comprising:
in response to determining, for a given version identifier of the at least one distribution window, that a filter term matching procedure for deciding whether or not to download and store the auxiliary application content delivered during the at least one distribution window has been performed:
ignoring any other instances of the distribution window associated with the same version identifier; and
performing the filter term matching procedure for deciding whether or not to download and store the auxiliary application content delivered during the at least one distribution window associated with a different version identifier.

* * * * *